United States Patent
Kim et al.

(10) Patent No.: US 11,706,838 B2
(45) Date of Patent: *Jul. 18, 2023

(54) METHOD AND APPARATUS FOR PERFORMING EFFICIENT LAYER 2 FUNCTION IN MOBILE COMMUNICATION SYSTEM

(71) Applicant: Samsung Electronics Co., Ltd., Suwon-si (KR)

(72) Inventors: Sangbum Kim, Suwon-si (KR); Soenghun Kim, Suwon-si (KR); Gert Jan Van Lieshout, Apeldoorn (NL)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/704,729

(22) Filed: Mar. 25, 2022

(65) Prior Publication Data

US 2022/0217812 A1 Jul. 7, 2022

Related U.S. Application Data

(63) Continuation of application No. 17/073,751, filed on Oct. 19, 2020, now Pat. No. 11,291,075, which is a (Continued)

(30) Foreign Application Priority Data

May 18, 2016 (KR) .......................... 10-2016-0061054

(51) Int. Cl.
*H04W 80/02* (2009.01)
*H04L 1/1607* (2023.01)
(Continued)

(52) U.S. Cl.
CPC ........... *H04W 80/02* (2013.01); *H04L 1/1614* (2013.01); *H04L 1/1621* (2013.01);
(Continued)

(58) Field of Classification Search
None
See application file for complete search history.

(56) References Cited

U.S. PATENT DOCUMENTS 8,634,312 B2 1/2014 Chun et al.
9,955,398 B2 4/2018 Belghoul et al.
(Continued)

FOREIGN PATENT DOCUMENTS

CN 104937975 A 9/2015
KR 10-2012-0074254 A 7/2012
(Continued)

OTHER PUBLICATIONS

International Search Report dated Apr. 1, 2016 issued in International Application No. PCT/KR2017/003558.
(Continued)

*Primary Examiner* — Otis L Thompson, Jr.
(74) *Attorney, Agent, or Firm* — Jefferson IP Law, LLP

(57) ABSTRACT

The present disclosure relates to a communication technique for converging IoT technology with a 5G communication system for supporting a higher data transfer rate beyond a 4G system, and a system therefor. The present disclosure can be applied to intelligent services (e.g., smart homes, smart buildings, smart cities, smart or connected cars, health care, digital education, retail business, and services associated with security and safety) on the basis of 5G communication technology and IoT-related technology. Disclosed are a method and an apparatus for configuring an efficient hierarchical layer 2 architecture and main functions thereof in a next-generation mobile communication system.

12 Claims, 19 Drawing Sheets

Related U.S. Application Data continuation of application No. 16/302,483, filed as application No. PCT/KR2017/005190 on May 18, 2017, now Pat. No. 10,820,370.

(51) Int. Cl.
*H04L 1/1812* (2023.01)
*H04W 28/06* (2009.01)
*H04W 80/08* (2009.01)
*H04L 1/1867* (2023.01)
*H04L 1/1829* (2023.01)
*H04W 76/20* (2018.01)
*H04L 69/00* (2022.01)

(52) U.S. Cl.
CPC .......... *H04L 1/1642* (2013.01); *H04L 1/1685* (2013.01); *H04L 1/188* (2013.01); *H04L 1/1812* (2013.01); *H04L 1/1848* (2013.01); *H04L 69/00* (2013.01); *H04W 28/06* (2013.01); *H04W 76/20* (2018.02); *H04W 80/08* (2013.01); *H04W 28/065* (2013.01)

(56) References Cited

U.S. PATENT DOCUMENTS

| | | |
|---|---|---|
| 10,039,132 B2 | 7/2018 | Lee et al. |
| 10,206,155 B2 | 2/2019 | Kim et al. |
| 10,257,748 B2 | 4/2019 | Kim et al. |
| 10,374,817 B2 | 8/2019 | Yi et al. |
| 10,568,154 B2 | 2/2020 | Aminaka et al. |
| 10,869,296 B2 | 12/2020 | Loehr et al. |
| 10,904,933 B2 | 1/2021 | Bangolae et al. |
| 2008/0186936 A1 | 8/2008 | Chun et al. |
| 2009/0003283 A1 | 1/2009 | Meylan |
| 2009/0046608 A1 | 2/2009 | Jiang |
| 2009/0086646 A1 | 4/2009 | Kuchibhotla et al. |
| 2009/0086659 A1 | 4/2009 | Pani et al. |
| 2009/0092138 A1* | 4/2009 | Joo .................. H04W 28/065 370/392 |
| 2009/0097425 A1 | 4/2009 | Sammour et al. |
| 2009/0163211 A1 | 6/2009 | Kitazoe et al. |
| 2009/0196175 A1 | 8/2009 | Sammour et al. |
| 2010/0278111 A1 | 11/2010 | Kashima et al. |
| 2010/0278176 A1 | 11/2010 | Faniuolo et al. |
| 2012/0224552 A1 | 9/2012 | Feuersanger et al. |
| 2012/0281566 A1 | 11/2012 | Pelletier et al. |
| 2013/0089057 A1 | 4/2013 | Worrall et al. |
| 2014/0004862 A1 | 1/2014 | Ekemark et al. |
| 2014/0023008 A1 | 1/2014 | Ahn et al. |
| 2014/0098761 A1 | 4/2014 | Lee et al. |
| 2014/0204746 A1 | 7/2014 | Sun et al. |
| 2014/0295868 A1 | 10/2014 | Lee |
| 2014/0341014 A1 | 11/2014 | Kim et al. |
| 2015/0078153 A1 | 3/2015 | Kuo et al. |
| 2015/0163708 A1 | 6/2015 | Kunugi et al. |
| 2015/0195743 A1 | 7/2015 | Sirotkin et al. |
| 2015/0208309 A1 | 7/2015 | Taneja et al. |
| 2015/0215839 A1 | 7/2015 | Johansson et al. |
| 2015/0264597 A1 | 9/2015 | Zhang et al. |
| 2015/0327110 A1 | 11/2015 | Jeong et al. |
| 2015/0334724 A1 | 11/2015 | Faccin et al. |
| 2015/0341821 A1 | 11/2015 | Hong et al. |
| 2015/0350954 A1 | 12/2015 | Faccin et al. |
| 2015/0365868 A1 | 12/2015 | Chang et al. |
| 2015/0373606 A1 | 12/2015 | Liu et al. |
| 2016/0007268 A1 | 1/2016 | Jung et al. |
| 2016/0044567 A1 | 2/2016 | Baghel et al. |
| 2016/0050709 A1 | 2/2016 | Bergström |
| 2016/0080958 A1 | 3/2016 | Rinne et al. |
| 2016/0112921 A1 | 4/2016 | Nagasaka et al. |
| 2016/0135089 A1 | 5/2016 | Catovic et al. |
| 2016/0135143 A1 | 5/2016 | Won et al. |
| 2016/0135231 A1 | 5/2016 | Lee et al. |
| 2016/0183159 A1 | 6/2016 | Cui et al. |
| 2016/0212793 A1 | 7/2016 | Jung et al. |
| 2016/0302112 A1 | 10/2016 | Chen |
| 2016/0338128 A1 | 11/2016 | Da Silva et al. |
| 2016/0345334 A1 | 11/2016 | Veerepalli et al. |
| 2017/0006641 A1 | 1/2017 | Dinan |
| 2017/0048737 A1 | 2/2017 | Pao et al. |
| 2017/0094577 A1 | 3/2017 | Kim et al. |
| 2017/0188352 A1 | 6/2017 | Lee et al. |
| 2017/0195031 A1 | 7/2017 | Onggosanusi et al. |
| 2017/0195949 A1 | 7/2017 | Nagasaka et al. |
| 2017/0310584 A1 | 10/2017 | Kim et al. |
| 2017/0332359 A1 | 11/2017 | Tsai et al. |
| 2017/0337614 A1 | 11/2017 | Costa et al. |
| 2017/0339613 A1 | 11/2017 | Fujishiro et al. |
| 2017/0366995 A1 | 12/2017 | Jung et al. |
| 2017/0367087 A1 | 12/2017 | Seo |
| 2017/0374610 A1 | 12/2017 | Kim et al. |
| 2018/0070288 A1 | 3/2018 | Kim et al. |
| 2018/0146390 A1 | 5/2018 | Kim |
| 2018/0176344 A1 | 6/2018 | Yang et al. |
| 2018/0192346 A1 | 7/2018 | Nagasaka et al. |
| 2018/0192356 A1 | 7/2018 | Trainin et al. |
| 2018/0199222 A1 | 7/2018 | Bergström et al. |
| 2018/0213584 A1 | 7/2018 | Yang |
| 2018/0227812 A1 | 8/2018 | Nagasaka et al. |
| 2018/0248606 A1 | 8/2018 | Choi et al. |
| 2018/0343584 A1 | 11/2018 | Yi et al. |
| 2018/0368023 A1 | 12/2018 | Hong et al. |
| 2019/0029006 A1 | 1/2019 | Wang et al. |
| 2019/0191328 A1 | 6/2019 | Dinan |
| 2019/0387080 A1 | 12/2019 | Liu et al. |
| 2021/0400448 A1 | 12/2021 | Adjakple et al. |
| 2022/0007371 A1 | 1/2022 | Kyung et al. |

FOREIGN PATENT DOCUMENTS

| | | |
|---|---|---|
| KR | 10-2016-0030962 A | 3/2016 |
| WO | 2015/050396 A1 | 4/2015 |
| WO | 2017-118229 A1 | 7/2017 |
| WO | 2017-128274 A1 | 8/2017 |

OTHER PUBLICATIONS

U.S. Office Action dated Feb. 6, 2020, issued in U.S. Appl. No. 15/476,794.
U.S. Office Action dated Jan. 21, 2020, issued in U.S. Appl. No. 16/245,035.
European Search Report dated Aug. 21, 2019, issued in the European Application No. 17799683.2.
European Search Report dated Feb. 13, 2019, issued in the European Application No. 17775899.2.
U.S. Office Action dated Feb. 25, 2019, issued in the U.S. Appl. No. 15/476,794.
Korean Office Action dated Oct. 26, 2020, issued in Korean Application No. 10-2017-0041832.
Extended European Search Report dated Nov. 24, 2020, issued in European Application No. 20192068.3.
U.S. Office Action dated Nov. 24, 2020, issued in U.S. Appl. No. 15/476,794.
Indian Office Action dated Apr. 5, 2021, issued in Indian Application No. 201837035043.
U.S. Office Action dated Aug. 19, 2021, issued in U.S. Appl. No. 15/476,794.
Notice of Allowance dated Sep. 13, 2021, issued in U.S. Appl. No. 16/946,880.
U.S. Notice of Allowance issued Feb. 9, 2022, in the U.S. Appl. No. 15/476,794.
Chinese Office Action dated Aug. 17, 2022, issued in Chinese Application No. 201780018529.8.

* cited by examiner (a) User plane PDCP Data PDU with short PDCP SN (7 bits)

(b) User plane PDCP Data PDU with long PDCP SN (12 bits)

(c) User plane PDCP Data PDU with extended PDCP SN (15 bits)

(a) PDCP Control PDU format for PDCP status report using an 18 bit SN (b) PDCP Control PDU format for LWA status report using a 15 bit SN

METHOD AND APPARATUS FOR PERFORMING EFFICIENT LAYER 2 FUNCTION IN MOBILE COMMUNICATION SYSTEM

CROSS-REFERENCE TO RELATED APPLICATION(S)

This application is a continuation application of prior application Ser. No. 17/073,751, filed on Oct. 19, 2020, which has issued as U.S. Pat. No. 11,291,075 on Mar. 29, 2022; which is a continuation application of prior application Ser. No. 16/302,483, filed on Nov. 16, 2018, which has issued as U.S. Pat. No. 10,820,370 on Oct. 27, 2020; and which is a 371 of an International application number PCT/KR2017/005190, filed on May 18, 2017 and is based on and claims priority under 35 U.S.C § 119(a) of a Korean patent application number 10-2016-0061054, filed on May 18, 2016, in the Korean Intellectual Property Office, the disclosure of which is incorporated by reference herein in its entirety.

TECHNICAL FIELD

The present invention relates to a method and apparatus for facilitating efficient operations of a terminal and a base station in a mobile communication system.

BACKGROUND ART

To meet the increased demand for wireless data traffic since the deployment of 4G communication systems, efforts have been made to develop an improved 5G or pre-5G communication system. Therefore, the 5G or pre-5G communication system is also called a "Beyond 4G Network" or a "Post LTE System". Implementation of the 5G communication system in higher frequency (mmWave) bands, e.g., 60 GHz bands, is being considered in order to accomplish higher data rates. To decrease propagation loss of the radio waves and increase the transmission distance, beamforming, massive multiple-input multiple-output (MIMO), Full Dimensional MIMO (FD-MIMO), array antenna, analog beam forming, and large scale antenna techniques are being discussed for the 5G communication system. In addition, in the 5G communication system, there are developments under way for system network improvement based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation, and the like. In the 5G system, Hybrid FSK and QAM Modulation (FQAM) and sliding window superposition coding (SWSC) as advanced coding modulation (ACM) and filter bank multi carrier (FBMC), non-orthogonal multiple access (NOMA), and sparse code multiple access (SCMA) as advanced access technology have been developed.

The Internet, which is a human centered connectivity network where humans generate and consume information, is now evolving into the Internet of Things (IoT) where distributed entities, such as things, exchange and process information without human intervention. The Internet of Everything (IoE), which is a combination of IoT technology and Big Data processing technology through connection with a cloud server, has emerged. As technology elements, such as "sensing technology", "wired/wireless communication and network infrastructure", "service interface technology", and "security technology" have been demanded for IoT implementation, recently there has been research into a sensor network, Machine-to-Machine (M2M) communication, Machine Type Communication (MTC), and so forth. Such an IoT environment may provide intelligent Internet technology services that create new values for human life by collecting and analyzing data generated among connected things. The IoT may be applied to a variety of fields including smart home, smart building, smart city, smart car or connected cars, smart grid, health care, smart appliances, and advanced medical services through convergence and combination between existing Information Technology (IT) and various industrial applications.

In line with these developments, various attempts have been made to apply the 5G communication system to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be an example of convergence between the 5G technology and the IoT technology.

Recently, studies are being conducted on Layer 2 structure and its main functions in line with the development of next generation mobile communication systems, and there is a need of an efficient Layer 2 structure and a method and apparatus for facilitating the main functions of Layer 2.

DISCLOSURE OF INVENTION

Technical Problem

The present invention aims to provide a method for configuring an efficient Layer 2 structure and its main functions.

Solution to Problem

In accordance with an aspect of the present invention, a method for transmitting a signal in a wireless communication system includes checking segment offset (SO) information, generating a first layer protocol data unit (PDU) including the SO information, and transmitting the first layer PDU, wherein the first layer PDU includes at least one header and a second layer PDU group corresponding to the header and the second layer PDU group includes at least one second layer PDU.

In accordance with another aspect of the present invention, a method for receiving a signal included in the wireless communication system includes receiving a first layer protocol data unit (PDU) including segment offset (SO) information, checking the SO information, and recovering a second layer PDU from the first layer PDU based on the SO information, wherein the first layer PDU includes at least one header and a second layer PDU group corresponding to the header and the second layer PDU group includes at least one second layer PDU.

In accordance with another aspect of the present invention, a transmitter for transmitting a signal in a wireless communication system includes a transmit unit configured to transmit the signal to a receiver and a controller configured to control to check segment offset (SO) information and generate a first layer protocol data unit (PDU) including the SO information and control the transmit unit to transmit the first layer PDU, wherein the first layer PDU includes at least one header and a second layer PDU group corresponding to the header and the second layer PDU group includes at least one second layer PDU.

In accordance with still another aspect of the present invention, a receiver for receiving a signal in a wireless communication system includes a receive unit configured to receive a signal from a transmitter and a controller configured to control the receive unit to receive a first layer protocol data unit (PDU) including segment offset (SO) information, check the SO information, and recover a second layer PDU from the first layer PDU based on the SO information, wherein the first layer PDU includes at least one header and a second layer PDU group corresponding to the header and the second layer PDU group includes at least one second layer PDU.

Advantageous Effects of Invention

The present invention is advantageous in terms of configuring an efficient Layer 2 structure and its main functions in a next generation mobile communication system.

MODE FOR THE INVENTION

Figure 1:
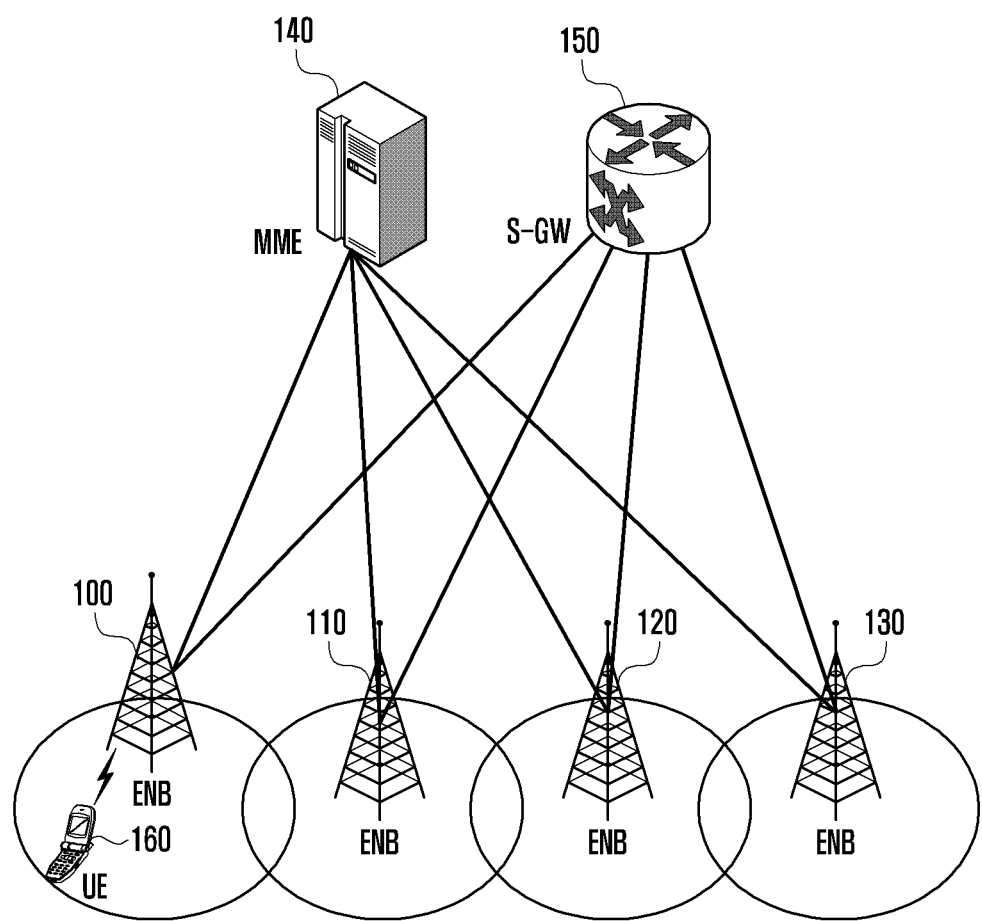
FIG. 1 is a diagram illustrating architecture of a legacy LTE system.

Exemplary embodiments of the present invention are described in detail with reference to the accompanying drawings. The same reference numbers are used throughout the drawings to refer to the same or like parts. Detailed descriptions of well-known functions and structures incorporated herein may be omitted to avoid obscuring the subject matter of the present invention.

Detailed descriptions of technical specifications well-known in the art and unrelated directly to the present invention may be omitted to avoid obscuring the subject matter of the present invention. This aims to omit unnecessary description so as to make clear the subject matter of the present invention.

For the same reason, some elements are exaggerated, omitted, or simplified in the drawings and, in practice, the elements may have sizes and/or shapes different from those shown in the drawings. Throughout the drawings, the same or equivalent parts are indicated by the same reference numbers.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this invention will be thorough and complete and will fully convey the concept of the invention to those skilled in the art, and the present invention will only be defined by the appended claims. Like reference numerals refer to like elements throughout the specification.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions that are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce articles of manufacture embedding instruction means that implement the function/act specified in the flowcharts and/or block diagrams. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time, or may be performed in reverse order according to their functions.

According to various embodiments of the present invention, the term "module", means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionalities of the components and modules may be combined into fewer components and modules or further separated into more components and modules. In addition, the components and modules may be implemented such that they execute one or more CPUs in a device or a secure multimedia card.

FIG. 1 is a diagram illustrating architecture of a legacy LTE system.

In reference to FIG. 1, a radio access network of the LTE system includes evolved Node Bs (hereinafter, interchangeably referred to as eNB, node B, and base station) 100, 110, 120, and 130; a mobility management entity (MME) 140; and a serving gateway (S-GW) 150. A user terminal (hereinafter, interchangeably referred to as user equipment (UE) and terminal) 160 connects to an external network via the eNBs 100, 110, 120, and 130 and the S-GW 150.

The eNBs 100, 110, 120, and 130 correspond to the legacy node Bs of the universal mobile telecommunications system (UMTS). The UE 160 connects to one of the eNBs via a radio channel, and the eNB has more complex functions than the legacy node B. In the LTE system where all user traffic including real time services such as Voice over IP (VoIP) is served through shared channels, there is a need of an entity for collecting UE-specific status information (such as buffer status, power headroom status, and channel status) and scheduling the UEs based on the collected information, and the eNB takes charge of such functions. Typically, one eNB hosts multiple cells. For example, the LTE system adopts Orthogonal Frequency Division Multiplexing (OFDM) as a radio access technology to secure a data rate of up to 100 Mbps in a bandwidth of 20 MHz. The LTE system also adopts Adaptive Modulation and Coding (AMC) to determine the modulation scheme and channel coding rate in adaptation to the channel condition of the UE. The S-GW 150 handles data bearer functions to establish and release a data bearer under the control of the MME 140. The MME 140 handles various control functions for the UE as well as the mobile management function and has connections with the eNBs.

Figure 2:
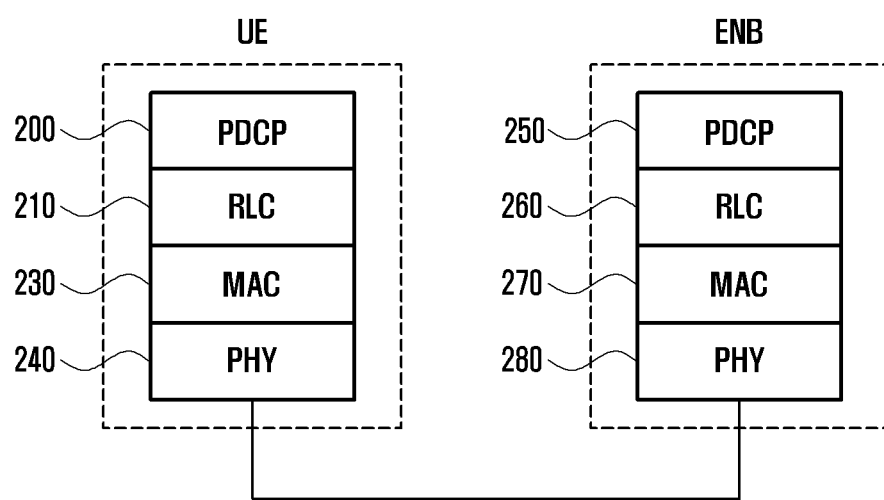
FIG. 2 is a diagram illustrating a protocol stack in use for legacy LTE systems.

FIG. 2 is a diagram illustrating a protocol stack in use for legacy LTE systems.

As shown in FIG. 2, the protocol stack of the interface between the UE and the eNB in the LTE system comprises a packet data convergence control (PDCP) layer denoted by reference numbers 200 and 250, a radio link control (RLC) layer denoted by reference numbers 210 and 260, and a medium access control (MAC) layer denoted by reference numbers 230 and 270. The PDCP layer denoted by reference numbers 200 and 250 takes charge of compressing/decompression an IP header. The main functions of the PDCP layer are summarized as follows:

Header compression and decompression: ROHC only;
Transfer of user data;
In-sequence delivery of upper layer PDUs at PDCP re-establishment procedure for RLC AM;
For split bearers in DC (only support for RLC AM): PDCP PDU routing for transmission and PDCP PDU reordering for reception;
Duplicate detection of lower layer SDUs at PDCP re-establishment procedure for RLC AM;
Retransmission of PDCP SDUs at handover and, for split bearers in DC, of PDCP PDUs at PDCP data-recovery procedure, for RLC AM;
Ciphering and deciphering;
Timer-based SDU discard in uplink.

The RLC layer denoted by reference numbers 210 and 260 takes charge of reformatting PDCP PDUs in order to fit them into the size for ARQ operation. The main functions of the RLC layer are summarized as follows:

Transfer of upper layer PDUs;
Error Correction through ARQ (only for AM data transfer);
Concatenation, segmentation, and reassembly of RLC SDUs (only for UM and AM data transfer);
Re-segmentation of RLC data PDUs (only for AM data transfer);
Reordering of RLC data PDUs (only for UM and AM data transfer);
Duplicate detection (only for UM and AM data transfer);
Protocol error detection (only for AM data transfer);
RLC SDU discard (only for UM and AM data transfer);
RLC re-establishment.

The MAC layer denoted by reference numbers 230 and 270 allows for connection of multiple RLC entities established for one UE and takes charge of multiplexing RLC PDUs from the RLC layer into a MAC PDU and demultiplexing a MAC PDU into RLC PDUs. The main functions of the MAC layer are summarized as follows:

Mapping between logical channels and transport channels;
Multiplexing/demultiplexing of MAC SDUs belonging to one or different logical channels into/from transport blocks (TB) delivered to/from the physical layer on transport channels;
Scheduling information reporting;
Error correction through HARQ;
Priority handling between logical channels of one UE;
Priority handling between UEs by means of dynamic scheduling;
MBMS service identification;
Transport format selection;
Padding.

The physical (PHY) layer denoted by reference numbers 240 and 280 takes charge of channel-coding and modulation on higher layer data to generate and transmit OFDM symbols over a radio channel, and demodulating and channel-decoding on OFDM symbols received over the radio channel to deliver the decoded data to the higher layers.

Figure 3:
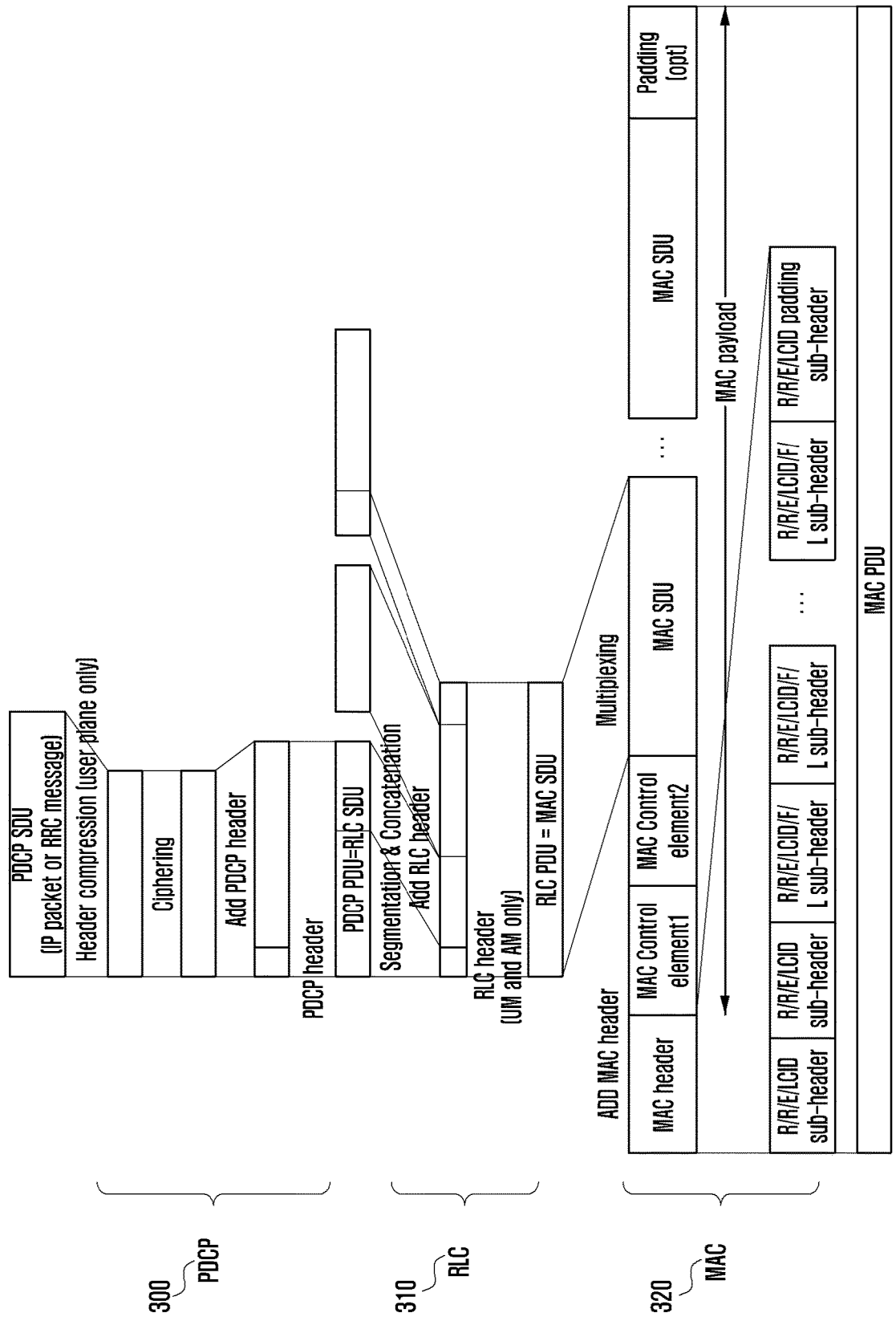
FIG. 3 is a diagram illustrating a packet processing procedure in the radio protocol stack architecture of the legacy LTE system.

FIG. 3 is a diagram illustrating a packet processing procedure in the radio protocol stack architecture of the legacy LTE system.

A packet sent down to the PDCP layer 300 is referred to as PDCP service data unit (SDU). The PDCP SDU may contain an IP packet (user plane) or RRC control information (control plane). The user plane data may undergo header compression. The header compression operation is taken to reduce the packet size by compressing the header. It may also be possible to undergo ciphering and an integrity protection operation. The ciphering operation is taken for ciphering the packet in order for a specific receiver to receive the packet correctly. The ciphering operation is performed to the payload of the PDCP PDU and MAC-I but not to the PDCP Control PDU. The integrity protection operation is taken for determining whether the packet is corrupted with wrong information. The integrity protection operation is performed to the header and payload of the PDCP PDU before the ciphering. A PDCP header is added to obtain a PDCP PDU.

The RLC layer 310 processes (segments or concatenates) the PDCP PDU (=RLC SDU) received from the PDCP layer into the size indicated by the MAC layer 320 to generate an RLC PDU. The segmentation and concatenation operations being performed in the RLC layer are described in detail with reference to FIG. 4. An RLC header is added to obtain the RLC PDU. The MAC layer 320 generates a MAC PDU composed of a MAC header and MAC payload. The MAC header contains MAC sub-headers corresponding to MAC control elements (CEs) and or MAC SDUs.

Figure 4:
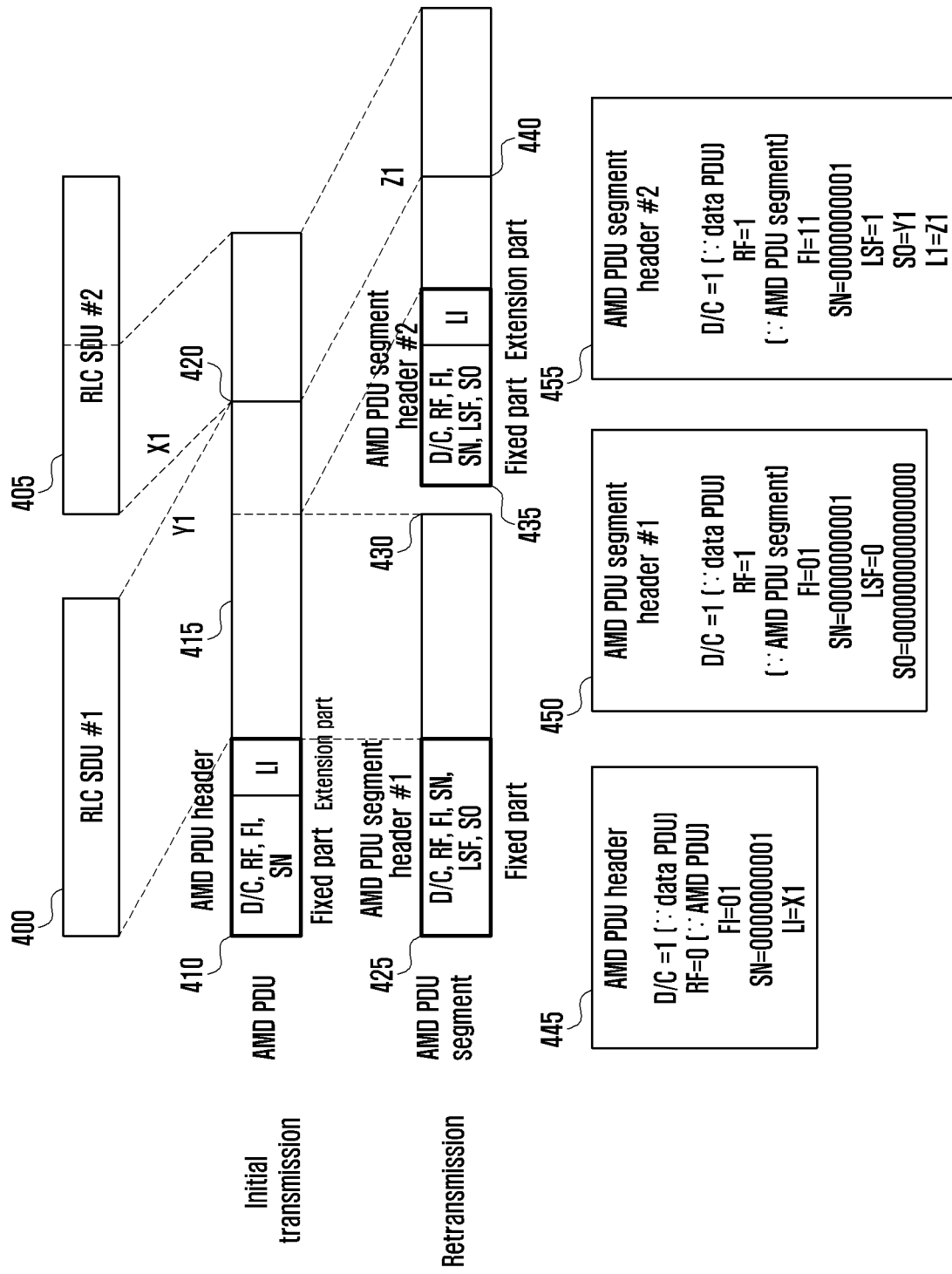
FIG. 4 is a diagram illustrating a packet segmentation or concatenation procedure in the LTE layer of the legacy LTE system.

FIG. 4 is a diagram illustrating a packet segmentation or concatenation procedure in the LTE layer of the legacy LTE system.

The RLC layer receives RLC SDUs (or PDCP PDUs) 400 and 405 from the PDCP layer. The RLC SDU is processed into the size as indicated by the MAC layer. In order to accomplish this, the RLC SDU may be segmented or concatenated with other RLC SDUs or a segment of another RLC SDU. In this embodiment, an AMD PDU being handled in association with ARQ is considered. For initial transmission, RLC SDU #1 and a segment of RLC SDU #2 are concatenated into one RLC PDU. The RLC PDU consists of an RLC header 410 and an RLC payload 415. The RLC header includes properties of the RLC PDU and segmentation or concatenation information. That is, the RLC header includes a data/control (D/C) field, a re-segmentation flag (RF) field, a framing information (FI) field, a sequence number (SN) field, and a length indicator (LI) field.

The D/C field has a length of 1 bit for indicating whether the RLC PDU is a control PDU or a data PDU.

TABLE 1

| Value | Description |
|---|---|
| 0 | Control PDU |
| 1 | Data PDU |

The RF field has a length of 1 bit for indicating whether the RLC PDU is an AMD PDU or an AMD PDT T segment

TABLE 2

| Value | Description |
|---|---|
| 0 | AMD PDU |
| 1 | AMD PDU segment |

The FI field has a length of 2 bits for indicating whether the start and end of the RLC PDU are the start and end of the RLC PDU or an RLC segment.

TABLE 3

| Value | Description |
|---|---|
| 00 | First byte of the Data field corresponds to the first byte of a RLC SDU. |

TABLE 3-continued

| Value | Description |
|---|---|
|  | Last byte of the Data field corresponds to the last byte of a RLC SDU. |
| 01 | First byte of the Data field corresponds to the first byte of a RLC SDU. |
|  | Last byte of the Data field does not correspond to the last byte of a RLC SDU. |
| 10 | First byte of the Data field does not correspond to the first byte of a RLC SDU. |
|  | Last byte of the Data field corresponds to the last byte of a RLC SDU. |
| 11 | First byte of the Data field does not correspond to the first byte of a RLC SDU. |
|  | Last byte of the Data field does not correspond to the last byte of a RLC SDU. |

The SN field indicates a sequence number of the RLC PDU.

The LI field is used for indicating the length of a segment of the RLC PDU, which has a length of 11 bits for RLC UM or 15 bits for RLC UM. Accordingly, the number of LI fields has to differ in proportion to the number of segments included in one RLC PDU.

The RLC payload includes the RLC SDU #1 and a segment of the RLC SDU #2, and the boundary between the two RLC SDUs is indicated by X1 420.

The RLC PDU generated as above is sent to the MAC layer. It may occur that the RLC PDU is not delivered successfully so as to be retransmitted by ARQ. The RLC PDU may be re-segmented for ARQ retransmission. The segment obtained through re-segmentation may be referred to as an AMD PDU segment for distinction from the normal AMD PDU. For example, the AMD PDU to be retransmitted as a result of transmission failure may be segmented into two AMD PDU segments for retransmission. In this case, the first AMD PDU segment carries the RLC payload part 430 with the size of Y1 of the default AMD PDU, and the second AMD PDU segment carries the remaining RLC payload part with the exception of the size of Y1. The second AMD PDU segment may include part (X1-Y1) of the original RLC SDU #1 400 as denoted by reference numbers 420 and 430 and part of the RLC SDU #2 405.

The AMD PDU segments also have RLC headers 425 and 435, each including the D/C field, the RF field, the FI field, the SN field, a last segment flag (LSF) field, a segment offset (SO) field, and the LI field. Unlike the RLC header of the AMD PDU, the RLC header of the AMD PDU segment further includes the LSF field and SO field.

The SSF field has a length of 1 bit for indicating whether the last byte of the AMD PDU segment is identical with the last byte of the AMD PDU.

TABLE 4

| Value | Description |
|---|---|
| 0 | Last byte of the AMD PDU segment does not correspond to the last byte of an AMD PDU. |
| 1 | Last byte of the AMD PDU segment corresponds to the last byte of an AMD PDU. |

The SO field has a length of 15 or 16 bits for indicating the original position of the AMD PDU segment in the AMD PDU. In FIG. 4, the SO field is set to 0 (byte) in the first AMD PDU segment header and Y1 in the second AMD PDU segment header. The AMD PDU header, the first AMD PDU segment, and the second AMD PDU header have the information fields set to the values as denoted, respectively, by reference numbers 445, 450, and 455.

The main functions of the above-described PDCP and RLC layers of the legacy LTE may be summarized as follows: security, ARQ, re-ordering, and duplicate detection in the PDCP layer; and ARQ, re-ordering, duplicate detection, and segmentation and concatenation in the RLC layer. The PDCP layer may perform retransmission in a predetermined situation such as PDCP reestablishment.

In order to meet the requirement for efficient packet transmission in the next generation mobile communication system, it is necessary to simplify the protocol stack and eliminate redundant functions appearing on multiple protocol layers in the legacy LTE protocol stack. Actually, the segmentation and concatenation operations of the RLC layer cause significant overhead in the legacy LTE protocol stack and thus there is a necessity to consider concentrating the operations performed redundantly in the PDCP and RLC layers into one of them.

The present invention proposes a novel L2 protocol structure composed of a PDCP layer with improved functionalities and a MAC layer instead of the legacy RLC layer for use in the next generation mobile communication system. In the new L2 protocol structure, the PDCP layer takes charge of ARQ, reordering, and duplicate detection operation in addition to its original functions. Because it communicates with the MAC layer directly, the PDCP layer also has to be responsible for the HARQ reordering operation; whereas the MAC layer is responsible for the segmentation and concatenation operations that have been taken by the LTE RLC layer with the exclusion of the RLC SDU re-segmentation operation entailed by the retransmission mechanism. This is because the ARQ operation is performed with PDCP PDUs as opposed to RLC PDUs. In order to communicate directly with the PDCP layer, the new MAC layer has to take charge of multiplexing and demultiplexing PDCP PDUs.

Figure 5:
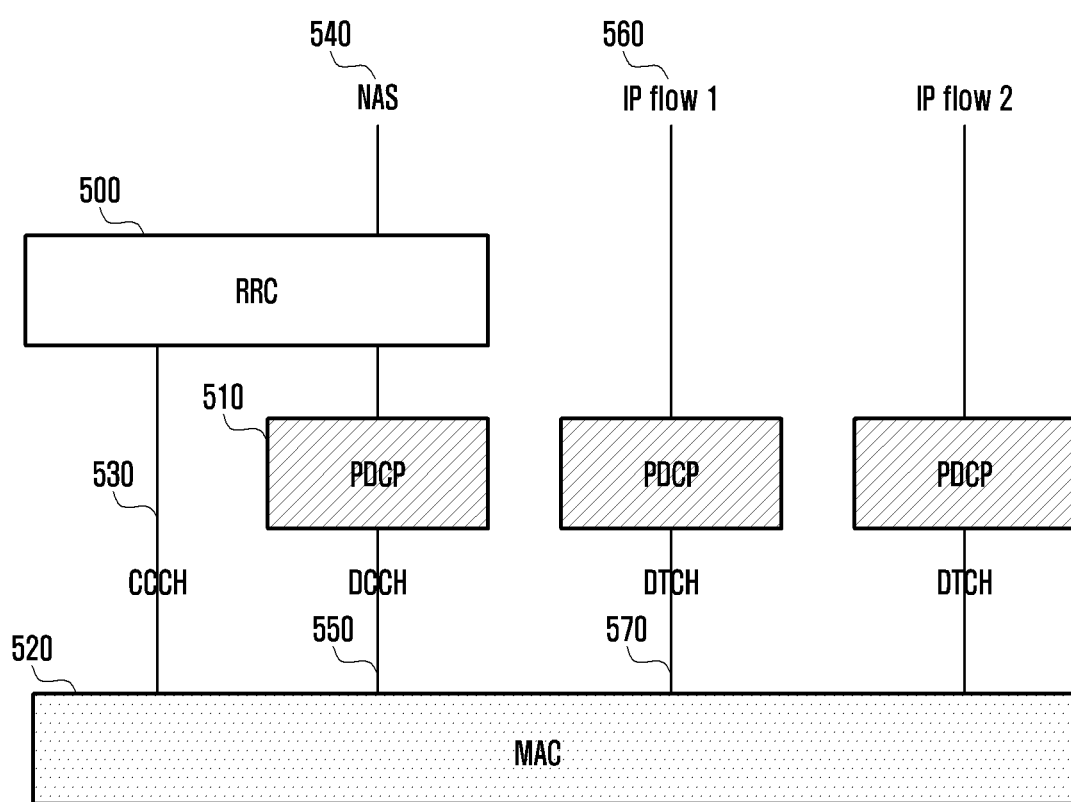
FIG. 5 is a diagram illustrating a proposed L2 protocol structure according to one embodiment of the present invention.

FIG. 5 is a diagram illustrating a proposed L2 protocol structure according to one embodiment of the present invention. As shown in FIG. 5, a control packet (control plane) is generated by the RRC layer 500 or an upper layer 540, and a common control packet belonging to a common control channel (CCCH) 530 is directly sent down to the MAC layer 520 logically without passing through the PDCCH layer 510. In contrast, a dedicated control packet belonging to a dedicated control channel (DCCH) 550 is sent down to the MAC layer via the PDCP layer 510. Meanwhile, a data packet 560 (user plane) belonging to a dedicated traffic channel (DCCH) 570 is sent down to the MAC layer via the PDCP layer.

Figure 6:
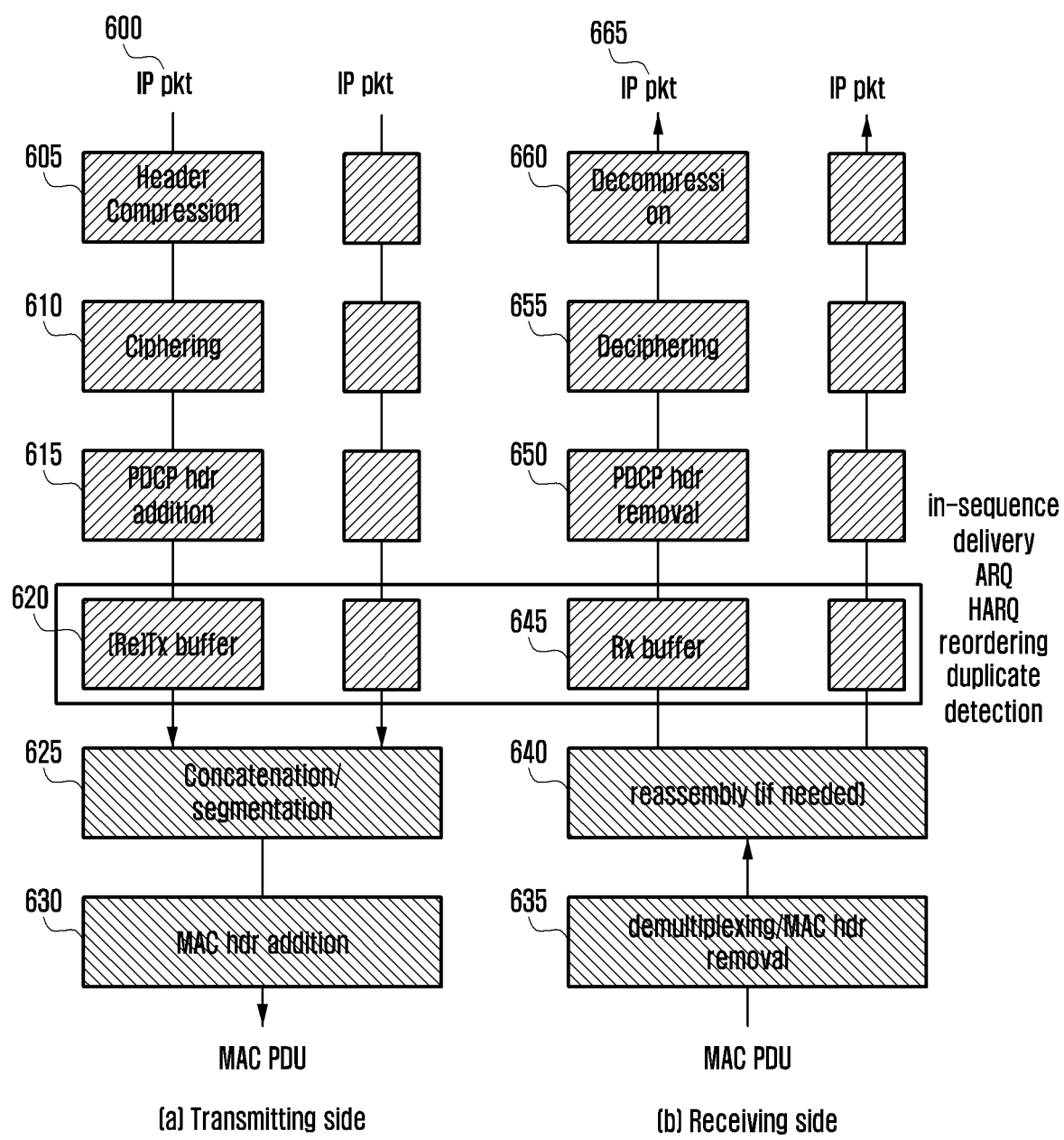
FIG. 6 is an operation flow diagram illustrating proposed L2 protocol operation flows according to an embodiment of the present invention.

FIG. 6 is an operation flow diagram illustrating proposed L2 protocol operation flows according to an embodiment of the present invention. In reference to FIG. 6, if a packet 600 arrives at the transmit end, the PDCP layer performs header compression at step 605, ciphering at step 610, and PDCP header addition at step 615. The PDCP PDU generated in this way is stored in a transmit buffer at step 620. The PDCP layer sends down the PDCP PDUs stored in the buffer to the MAC layer as a lower layer according to a first-in first-out (FIFO) rule. The PDCP PDUs sent downlink to the MAC layer are kept, as opposed to being immediately discarded, in the buffer for ARQ retransmission until a predetermined condition is fulfilled.

If the PDCP PDUs are received, the MAC layer performs segmentation or concatenation at step 625 according to the MAC PDU size. Afterward, the MAC layer adds a MAC header to generate a MAC PDU at step 630. The MAC header may include certain fields that are not included in the legacy MAC header because the MAC layer is responsible for segmentation and concatenation operations. The newly added fields are described later.

At the receive end, the MAC layer removes the MAC headers from the received MAC PDUs and performs demultiplexing at step 635. The PDCP PDU conveyed in multiple MAC PDUs is reassembled (if necessary) at step 640. The reassembled PDCP PDU is delivered to the PDCP layer. The PDCP layer stores the PDCP PDU in a receive buffer at step 645. The PDCP PDU is not delivered to the PDCP layer in order of SN because the HARQ operation is performed in the MAC layer. Accordingly, there is a need of a reordering operation. The PDCP layer performs duplicate detection and redundant PDCP PDU removal for the case where redundant PDCP PDUs are delivered from the MAC layer. At the receive end, if no PDCP PDU is received until a predetermined condition is fulfilled or a predetermined time expires, the PDCP layer may transmit feedback information to the transmit end for ARQ retransmission. The feedback information includes the information on the missing PDCP PDUs in the form of a bitmap. Upon receipt of the feedback information, the transmit end retransmits the missing PDCP PDUs. Since the whole PDCP PDU is retransmitted, the necessity of the re-segmentation that has been performed in the legacy RLC layer is obviated. The PDCP layer performs PDCP header removal at step 650, deciphering at step 655, and decompression at step 660 on the successfully received PDCP PDU to recover the PDCP SDU at step 665.

Figure 7A:
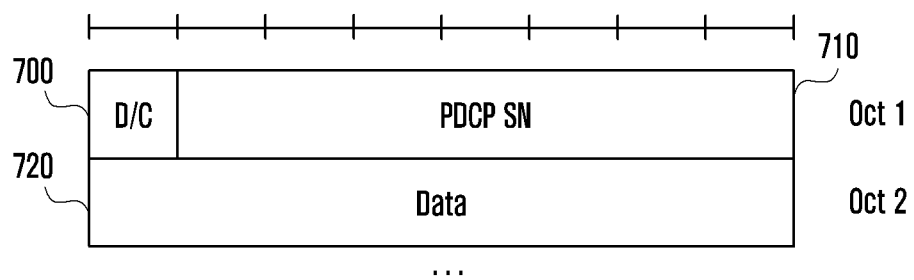
FIGS. 7A, 7B, and 7C are diagrams illustrating PDCP PDU formats in use for the legacy LTE system.
Figure 7B:
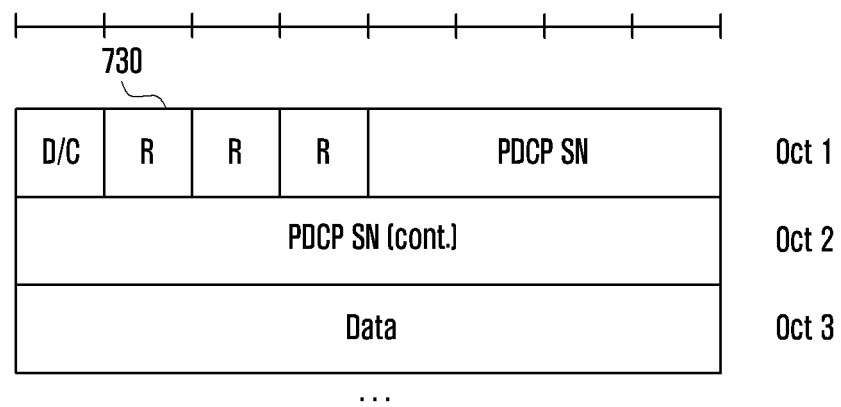
Figure 7C:
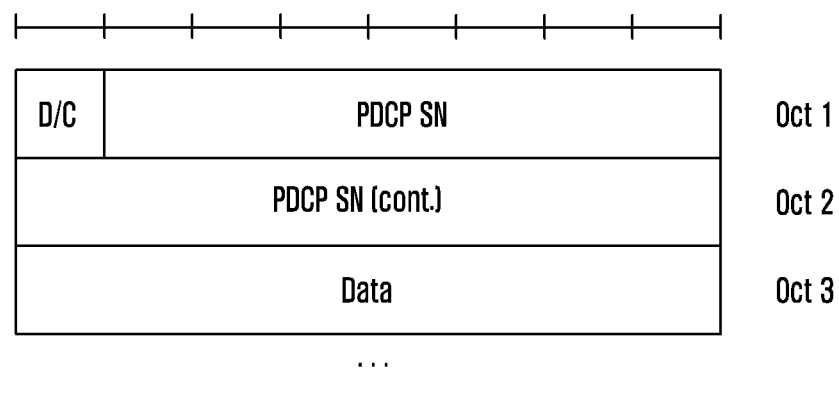

FIGS. 7A, 7B, and 7C are diagrams illustrating PDCP PDU formats in use for the legacy LTE system.

The PDCP data PDU format has a PDCP SN 710 that differs in length. The PDCP SN is set when the RB is established. As an option, MAC-I may be included in the PDCP data PDU. FIG. 7A shows a user plane PDCP data PDU formation with a 7-bit PDCP SN. FIG. 7B shows a user plane PDCP data PDU formation with a 12-bit PDCP SN. In FIG. 7B, the first octet includes 3 reserved bits 730. FIG. 7 shows a user plane PDCP data PDU with a 15-bit PDCP SN. The PDCP SN is followed by data 710, and every PDCP PDU includes a D/C field 700.

Figure 8:
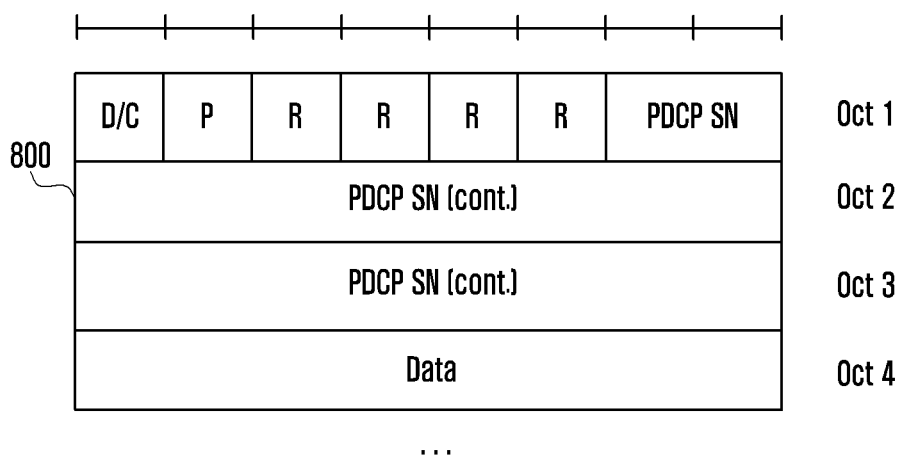
FIG. 8 is a diagram illustrating a PDCP PDU format according to one embodiment of the present invention.

FIG. 8 is a diagram illustrating a PDCP PDU format according to one embodiment of the present invention.

It may be assumed that the next generation mobile communication system supports a high speed transmission that is faster than ever before. This means that the system is likely to run short of legacy PDCP SNs having a length up to 15 bits. Accordingly, there is a need of a PDCP data PDU formation with a PDCP SN longer than 15 bits. The present invention proposes a PDCP data PDU format 800 including a D/C field and 5 reserved bits in the first octet, the reserved bits being followed by an 18-bit PDCP SN.

Figure 9A:
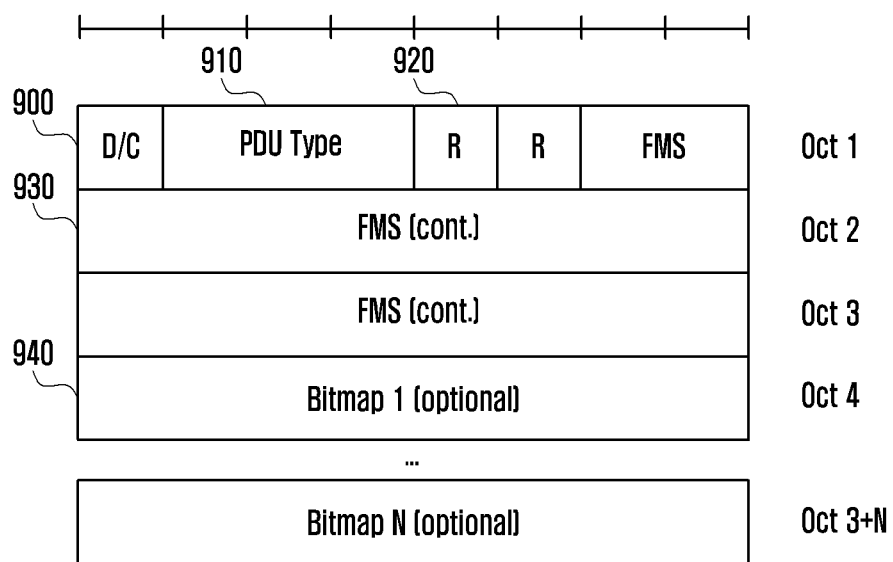
FIGS. 9A and 9B are diagrams illustrating PDCP status report formats in use for the legacy LTE system.
Figure 9B:
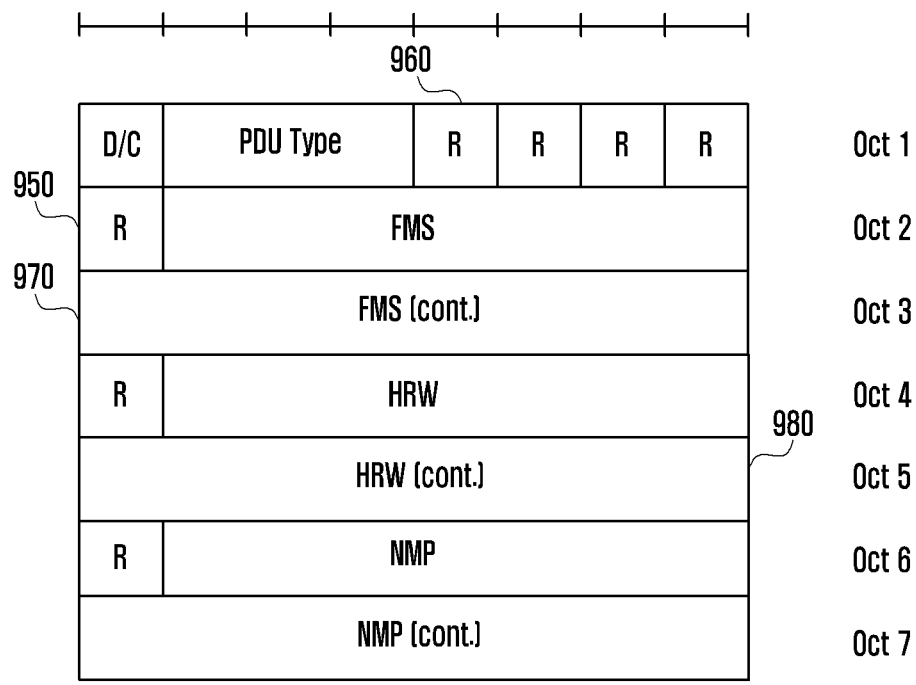

FIGS. 9A and 9B are diagrams illustrating PDCP status report formats in use for the legacy LTE system.

In the legacy LTE system, PDCP status report and RLC status PDUs are defined for supporting a retransmission scheme. Such PDU formats aim to notify the transmitter of missing packets. The legacy RLC STATUS PDU is characterized by including SNs of the missing packets (RLC PDUs) and SOstart and SOend fields for indicating the missing portion per SN.

For the next generation mobile communication system assuming a high-speed transmission, considering that a missing MAC PDU, although rarely occurring, causes a large number of missing PDCP PDUs concatenated therein, there is likely to be a preference for defining a new format based on the legacy PDCP status report format rather than using the legacy RLC STATUS PDU format designed for carrying SNs of all missing packets.

FIG. 9A shows a PDCP status report format with a 18-bit SN. The PDCP status report is transmitted when a PDCP re-establishment is requested, a polling bit (P) field set to 1 is received, or a t-StatusReportType1 timer expires. This PDCP status report format includes a D/C field 900, a PDU type field 910, a first missing PDCP SN (FMS) field 930, and a bitmap field 940.

The PDU type field has a length of 3 bits for indicating a type of the PDU. The type of PDU is indicated as in Table 5.

TABLE 5

| Bit | Description |
| --- | --- |
| 000 | PDCP status report |
| 001 | Interspersed ROHC feedback packet |
| 010 | LWA status report |
| 011-111 | reserved |

The FMS field is identical in bitwidth with the SN field and used to indicate the PDCP SN of the first missing PDCP SDU.

The bitmap field has a zero-length variable length. This field is used to indicate the successfully received PDCP SDUs following the PDCP SDU indicated via the FMS field. For example, the MSB of the first octet of this field is used to indicate whether the PDCP SDU with the PDCP SN of (FMS+1) modulo (Maximum_PDCP_SN+1) is received. The LSP of the first octet of this field is used to indicate whether the PDCP SDU with the PDCP SN of (FMS+8) modulo (Maximum_PDCP_SN+1) is received. Each bit of the bitmap field is set for the purpose of indication as follows.

TABLE 6

| Bit | Description |
| --- | --- |
| 0 | PDCP SDU with PDCP SN = (FMS + bit position) modulo (Maximum_PDCP_SN + 1) is missing in the receiver. The bit position of $N^{th}$ bit in the Bitmap is N, i.e., the bit position of the first bit in the Bitmap is 1. |
| 1 | PDCP SDU with PDCP SN = (FMS + bit position) modulo (Maximum_PDCP_SN + 1) does not need to be retransmitted. The bit position of $N^{th}$ bit in the Bitmap is N, i.e., the bit position of the first bit in the Bitmap is 1. |

FIG. 9B shows a PDCP status report formation with a 15-bit SN in use for LTE-Wi-Fi link aggregation (LWA) technology. This PDCP status report is transmitted when a polling bit (P) field set to 1 is received or a t-StatusReportType2 timer expires. This PDCP status report format includes a highest received SN on WLAN (HRW) and a number of missing (PDUs) fields in addition to the information fields of the PDCP status report format of FIG. 9A.

The NMP field is identical in bitwidth with the SN field and used to indicate the number of missing PDCP PDUs from the PDCP PDU indicated by the FMS field.

The HRW field is identical in bitwidth with the SN field and used to indicate the PDCP SN of the PDCP SDU received via a WLAN with the highest PDCP COUNT value.

However, the legacy PDCP status report is not appropriated for the ARQ operation in the next generation mobile communication system assuming high-speed transmission. This is the case particularly when considering that PDCP PDU loss occurs rarely, but if it does occur a large number of PDCP PDUs are missing in a concatenated manner. For example, if the nth PDCP PDU and the (n+16000)th PDCP PDU are missing, this means that the bitmap field with a very large length of 2000 bytes is required. Furthermore, the status report for the LWA is designed for flow control as opposed to ARQ. Accordingly, it may be necessary to define the new format indicative of the missing PDCP PDUs and report trigger conditions, by referring to the legacy PDCP status report.

Figure 10:
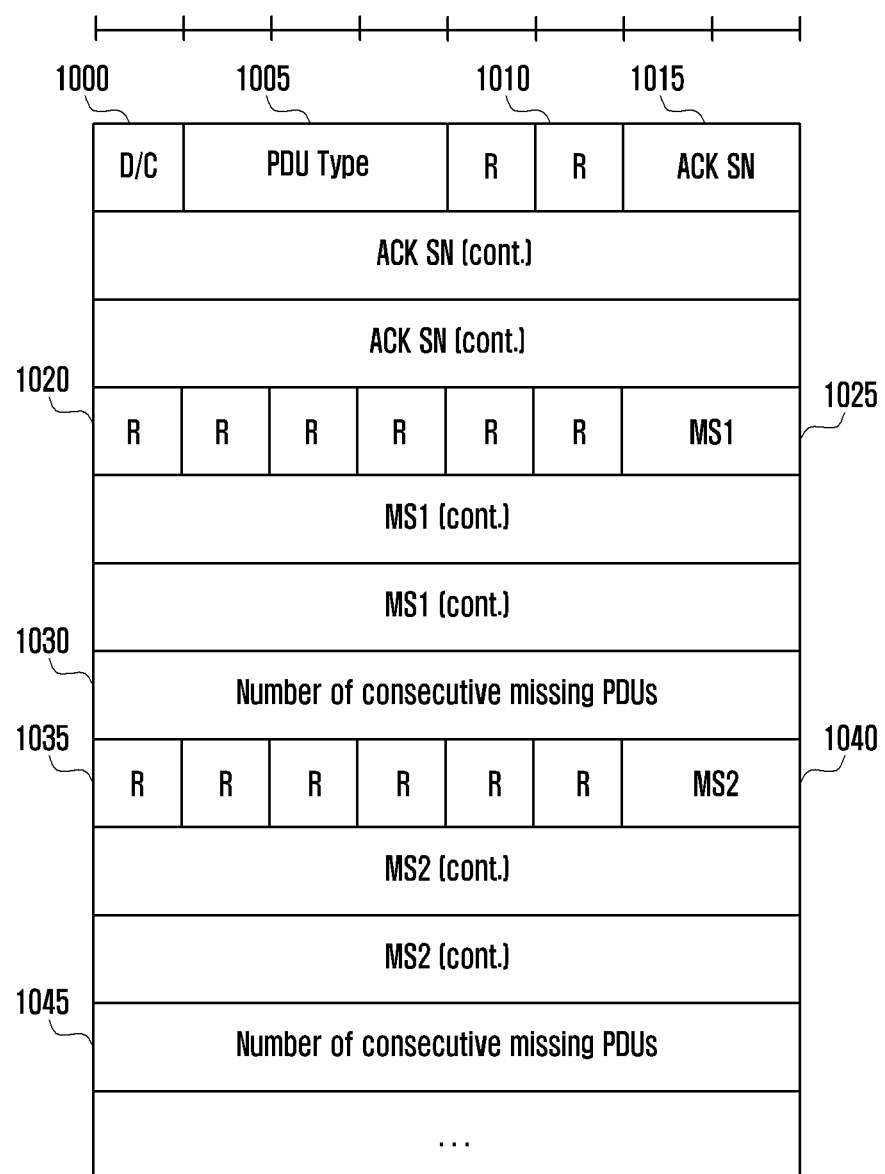
FIG. 10 is a diagram illustrating a proposed PDCP status report format according to one embodiment of the present invention.

FIG. 10 is a diagram illustrating a proposed PDCP status report format according to one embodiment of the present invention.

Considering that PDCP PDU loss occurs rarely, but if it does occur a large number of PDCP PDUs are lost in a concatenated manner as aforementioned, the present invention proposes a method of indicating the SN of the first missing PDCP PDU and the number of consecutive missing PDCP PDUs. Also, it should be possible for a PDCP status report format to indicate all of the sets of consecutive missing PDCP PDUs.

The proposed format includes an ACK SN field 1015, missing SN (MS) fields 1025 and 1040 indicating the SNs of the first missing PDCP PDUs in the respective missing PDCP PDU sets, and NCMP (number of consecutive missing PDUs) fields 1030 and 1045. An MS field is followed by an NCMP field in a paired manner. That is, the NCMP field indicates the number of missing PDUs starting from the first PDU indicated by the paired MS field. The NCMP field may count the first missing PDCP PDU in or not. The PDCP status report format may include multiple MS and NCMP fields.

The proposed format includes a D/C field 1000, a PDU Type field 1005, and an ACK SN field 015. The D/C field is set to 0 for a control PDU, the PDU type field is set to 000 for the PDCP status report or one of reserved values (011 to 111) for the new PDCP status report. The ACK SN field is identical in definition with that included in the RLC STATUS PDU and indicates that the PDCP PDUs to the PDCP PDU indicated thereby, without exception of the missing PDCP PDU indicated by the MS and NCMP fields, are received at the receive end. In order to maintain the unity of the PDCP status report format, the reserved bits 1010, 1020, and 1030 may be inserted. These reserved bits may be omitted, and the MS field, the NCMP field, and the ACK field may be defined differently in position and length in the format as opposed to those shown in the drawing.

The proposed PDCP status report may be transmitted when a polling bit (P) field set to 1 is received or a t-StatusReportType3 timer expires when or after the last PDCP PDU stored in the PDCP transmit buffer is transmitted. The proposed PDCP status report may also be transmitted when the PDCP receive end detects a missing PDU. Also, a polling timer may be used for the polling operation. That is, the PDCP transmit end may start a timer after transmitting a PDU including the polling bit (P) field set to 1 and, if the timer expires, it may transmit a PDU including the polling bit (P) field set to 1 again. After transmitting a predetermined number of PDUs or bytes, the transmit end may transmit a PDU including the polling bit (P) field set to 1. The PDCP receive end may start a timer after transmitting the PDCP status report and, if the timer expires, it may transmit the status report again.

Hereinafter, a description is made of the in-sequence delivery, duplicate detection, and HARQ reordering as PDCP functions.

The in-sequence delivery, duplicate detection, and reordering have been already defined (for dual connectivity in which the PDCP layer takes charge of reordering because one PDCP entity transmits/receives data via two RLC entities). If the split bearer is not configured, it may be possible to set the reordering timer to a low value. For the optimization purpose, it may be possible to start the t-ordering from the last missing PDU rather than the first missing PDU.

The above description has been made of the method for improving PDCP layer operation in the proposed L2 protocol structure. The newly proposed MAC layer has to perform demultiplexing, augmentation, and reassembly operations. The multiplexing operation requires a logical channel identifier (LCID) and a length field, and the segmentation and reassembly operations require the SN and segmentation information.

Figure 11:
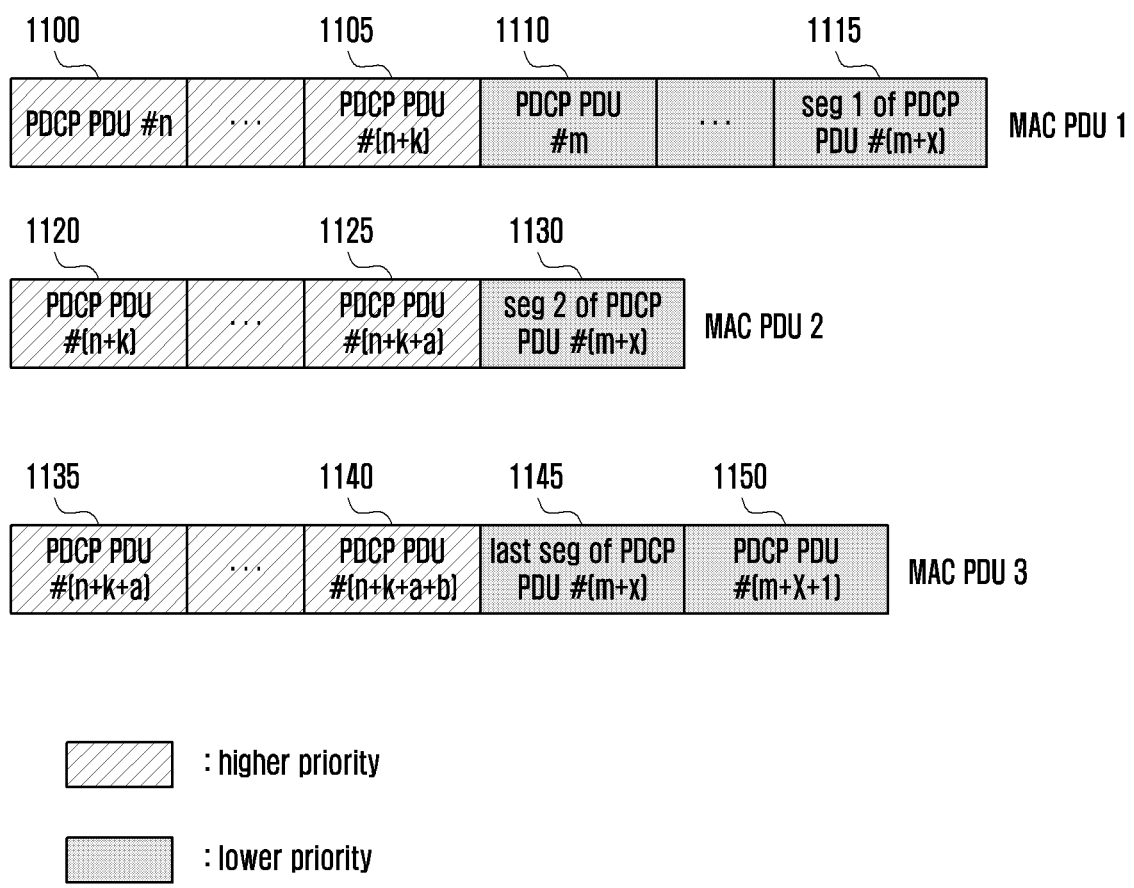
FIG. 11 is a diagram illustrating multiplexed and segmented conceptual MAC PDUs according to one embodiment of the present invention.

FIG. 11 is a diagram illustrating multiplexed and segmented conceptual MAC PDUs according to one embodiment of the present invention. In FIG. 11, each MAC PDU contains a plurality of PDCP PDUs that are distinctive in color. The PDCP PDUs that have the same color belong to one MAC SDU group with the same priority. The multiple PDCU PDUs 1100 to 1105 belonging to one MAC SDU group occupy part of the MAC PDU 1, and the other PDCP PDUs 1110 to 1115 belonging to another MAC SDU group occupy the remaining part of the MAC PDU 1. Such an arrangement may be performed according to the priorities of the MAC SDUs.

If the last PDCP PDU cannot be wholly included in the MAC PDU 1, it may be segmented such that a segment 1115 of the last PDCP PDU is included in the MAC PDU 1. Similarly, another segment 1130 of the last PDCP PDU is included in the MAC PDU 2, and the last segment 1150 of the last PDCP PDU is included in the last MAC PDU 3. Considering the multiplexing and segmentation operations, the header has to include the information necessary for demultiplexing and assembly at the receive end. Although the drawing shows a conceptual MAC PDU, the MAC PDU has to have a header containing the necessary information at the beginning or a predetermined part thereof.

Figure 12:
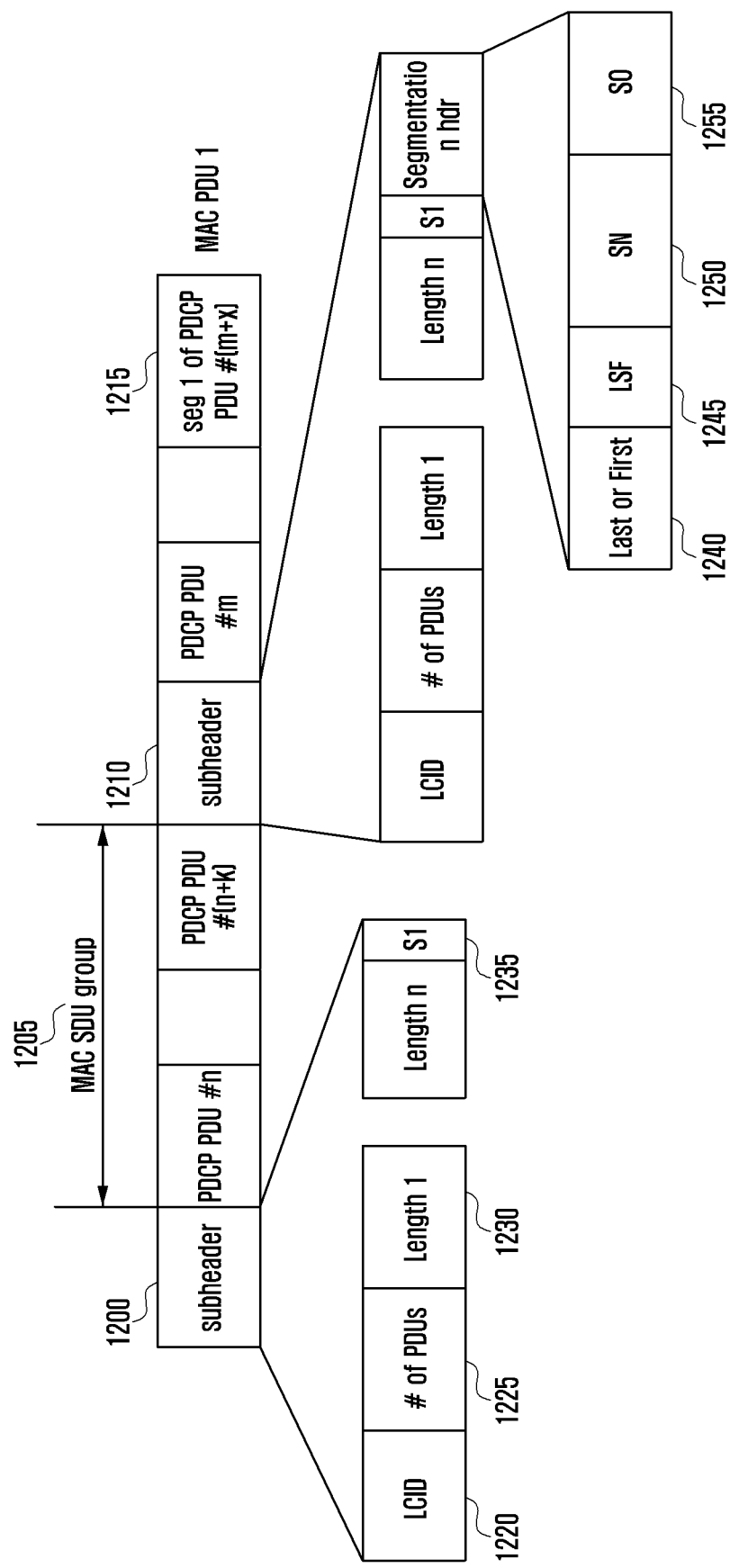
FIG. 12 is a diagram illustrating a MAC PDU configured through multiplexing and segmentation in consideration of a header part according to one embodiment of the present invention.

FIG. 12 is a diagram illustrating a MAC PDU configured through multiplexing and segmentation in consideration of a header part according to one embodiment of the present invention. According to the legacy technology, sub-headers corresponding to the respective MAC CEs and/or MAC SDUs (logical channel) are all located at the beginning of the MAC PDU, and each sub-header has an E field for indicating whether another sub-header or MAC CE or MAC SDU follows.

In the present invention, the MAC SDU groups (logical channel) have respective sub-headers 1200 and 1210 at the beginnings thereof in order to avoid the overhead caused by the E field being inserted per sub-header. Each sub-header may include an LCID field 1220, a field 1225 indicating the number of PDCP PDUs in the MAC SDU 1225, a field 1230 indicating the length of the PDCP PDU or segmented PDCP PDU, and an S1 field 1235. The S1 field has a length of 1 bit and indicates whether the MAC SDU includes a segmented PDCP PDU. It may be possible to add at least one of a last or first field 1240, a last segment flag (LSF) field 1245, an SN field 1250, and a segment offset (SO) field 1255 depending on whether or not the segmented PDCP PDU exists.

The last or first field 1240 is used to indicate whether the segmented PDCP PDU is at the beginning or end of the MAC SDU group. The LSF field 1245 indicates whether the last byte of the segmented PDCP PDU is identical with the last part of the MAC SDU group as in Table 7.

TABLE 7

| Value | Description |
| --- | --- |
| 0 | Last byte of the PDCP PDU segment does not correspond to the last byte of an MAC SDU group. |
| 1 | Last byte of the PDCP PDU segment corresponds to the last byte of an MAC SDU group. |

The SN field 1250 indicates the SN of the segmented PDCP PDU. The SO field 1255 is used to indicate the location of the segmented PDCP PDU in the original PDCP PDU.

The segmentation may be configured for uplink and downlink separately because it is an operation incurring significant overhead in the L2 layer. Considering 20 MHz DL system bandwidth, the maximum TB size is 10992; assuming that the DL system bandwidth of the next generation mobile communication is 100 MHz, the maximum TB size becomes no less than 54960 bytes. Considering the IP packet size of 1500 bytes, the base station may control the MAC PDU generation without the burdensome segmentation operation in downlink. Accordingly, it may be possible to allow segmentation in downlink but not in uplink. Whether to configure segmentation may be determined according to the TB size indicated by the base station. If segmentation is configured, the S1 field should be included in the sub-header. Otherwise, it is not necessary to include the SI field in the sub-header. The bit corresponding to the S1 field may be used to indicate the length of the PDCP PDU.

That is, the MAC PDU format for the case of configuring segmentation and the MAC PDU format for the case of not configuring segmentation may differ as follows. Various MAC PDU formats are possible and, according to an embodiment of the present invention, the MAC sub-header is included per PDCP PDU and includes the LCID field, the length field, and the S1 field for the corresponding PDCP PDU.

If segmentation is configured, a predetermined field of the MAC sub-header may be used to indicate the presence/absence of a segmentation header. For example, the MAC sub-header may include an n-bit LCID field, an m-bit length field, and 1-bit SI field (first format).

If segmentation is not configured, a predetermined field (S1 field) of the MAC header may be used for a different purpose, e.g., for expanding the field indicating the size of the MAC SDU (or PDCP PDU) related to the MAC header. For example, the MAC sub-header may include an n-bit LCID field and an (m+1)-bit length field (second format).

Segmentation may be configured or not according to a predetermined condition or configured by the base station per UE. For example, it may be possible to configure segmentation in uplink but not in downlink. In this case, the UE may generate uplink MAC PDUs with the first MAC sub-header format and process downlink MAC PDUs assuming the second MAC sub-header format. It may also be possible for the base station to configure whether to use segmentation or not in downlink per UE using an RRC control message under the assumption of the use of segmentation in uplink. It may also be possible that the information on whether to use segmentation is delivered to unspecified UEs via system information being broadcast by the base station.

It may also be possible to configure segmentation to be used if a predetermined condition is fulfilled. For example, it may be possible to determine whether to use segmentation based on the size of the MAC PDU (or transport block). If the size of the MAC PDU to be transmitted by the UE is shorter than x bytes, the UE generates the MAC PDU with the first MAC sub-header format; if the size of the MAC PDU is longer than x bytes, the UE generates the MAC PDU with the second MAC sub-header format without consideration of segmentation. If the size of the MAC PDU received by the UE is shorter than y bytes, the UE processes the MAC PDU under the assumption of the first MAC sub-header format; if the size of the MAC PDU is longer than y bytes, the UE processes the MAC PDU under the assumption of the second MAC sub-header format. The values of x and y are delivered from the base station to the UE via an RRC control message or system information. The first and second MAC sub-header formats differ in length of a predetermined information field (e.g., length field and presence/absence of a predetermined field).

Figure 13:
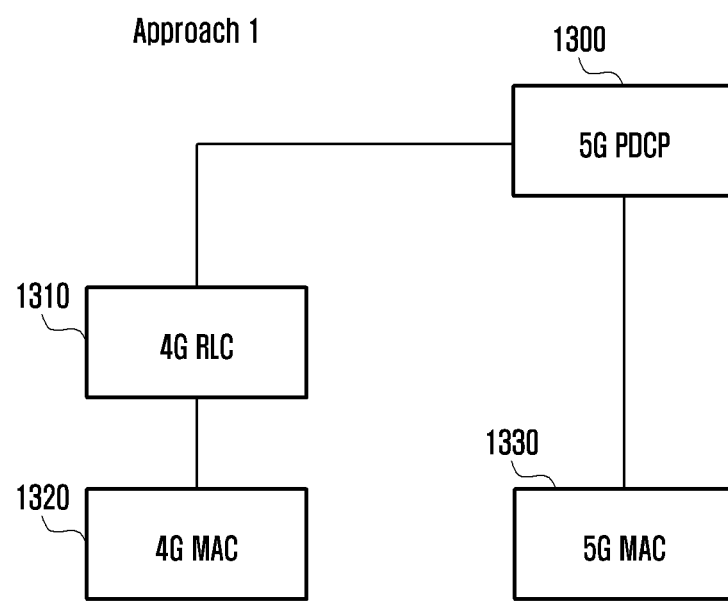
FIG. 13 is a diagram illustrating a method for use of the 5G PDCP layer in common.
Figure 14:
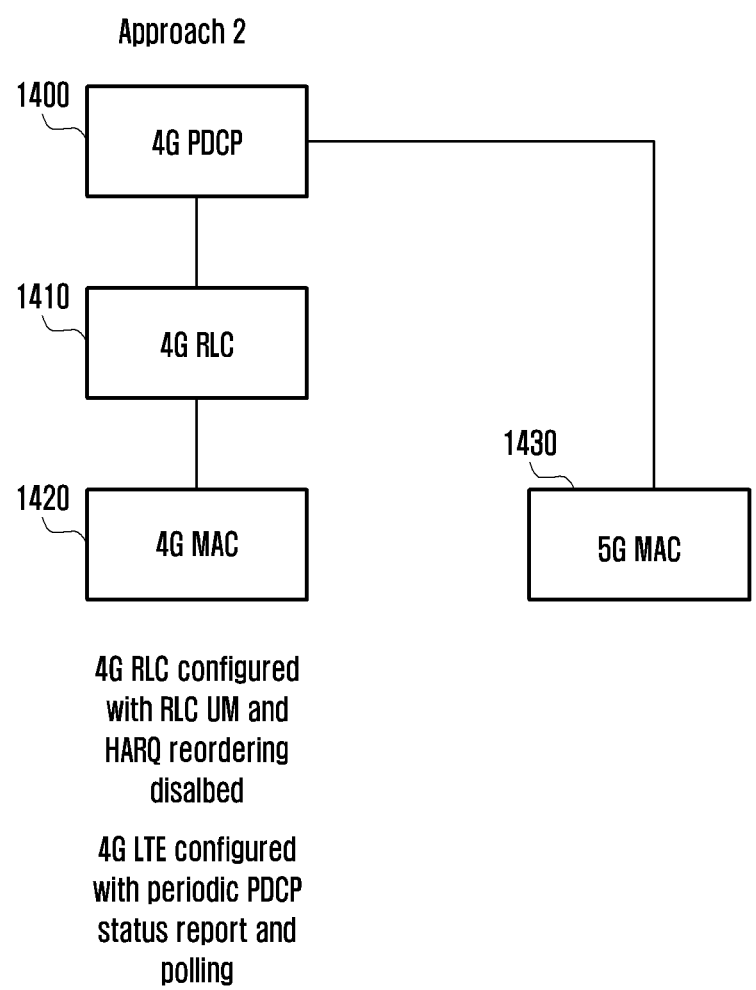
FIG. 14 is a diagram illustrating a method for use of the LTE (4G) PDCP layer in common.

FIGS. 13 and 14 are diagrams for explaining interoperation with a legacy LTE system according to one embodiment of the present invention.

Similar to the RAN split in the legacy dual connectivity technology, the UE may transmit/receive data via LTE eNB and 5G base station simultaneously. In other to achieve this, the UE has to operate in the LTE system in a similar way to that in the 5G system.

FIG. 13 is a diagram illustrating a method for use in common of the 5G PDCP layer.

In reference to FIG. 13, the ARQ operation in the 5G PDCP layer 1300 obviates the necessity of the ARQ operation in the 4G RLC layer 1310. Accordingly, the 4G RLC layer 1310 is configured to operate in the RLC unacknowledged mode (UM) in which the ARQ operation is not required. Also, the HARQ reordering operation in the 5G PDCP layer 1300 obviates the necessity of the HARQ reordering operation in the 4G RLC layer 1310. The proposed ARQ operation of the present invention is designed to yield maximum ARQ performance in the 5G PDCP layer 1300.

FIG. 14 is a diagram illustrating a method for use in common of the LTE (4G) PDCP layer.

In the case that the 4G PDCP layer is used in common, it is difficult for the ARQ operation to be fully performed in the 4G PDCP layer 1400. For example, it is necessary to configure a periodic PDCP status report and polling and even impossible to use the PDCP status report format proposed in the present invention. Accordingly, although it is performed in the 4G PDCP layer, the ARQ operation is somewhat limited in performance. The 4G RLC layer 1410 is configured to operate in the RLC UM mode requiring no ARQ, which obviates the necessity of the HARQ reordering.

According to an embodiment of the present invention, a signal transmission method of a transmitter in a wireless communication system includes checking segment offset (SO) information, generating a first layer protocol data unit (PDU) including the SO information, and transmitting the first layer PDU, wherein the first layer PDU includes at least one of a header and a second layer PDU group corresponding to the header, the second layer PDU group including at least one second layer PDU.

According to an embodiment of the present invention, a signal reception method of a receiver in a wireless communication system includes receiving a first layer protocol data unit (PDU) including segment offset (SO) information, ascertaining the SO information, and recovering a second layer PDU from the first layer PDU based on the SO information, wherein the first layer PDU includes at least one header and a second layer PDU group corresponding to the header, the second layer PDU group including at least one second layer PDU.

Figure 15:
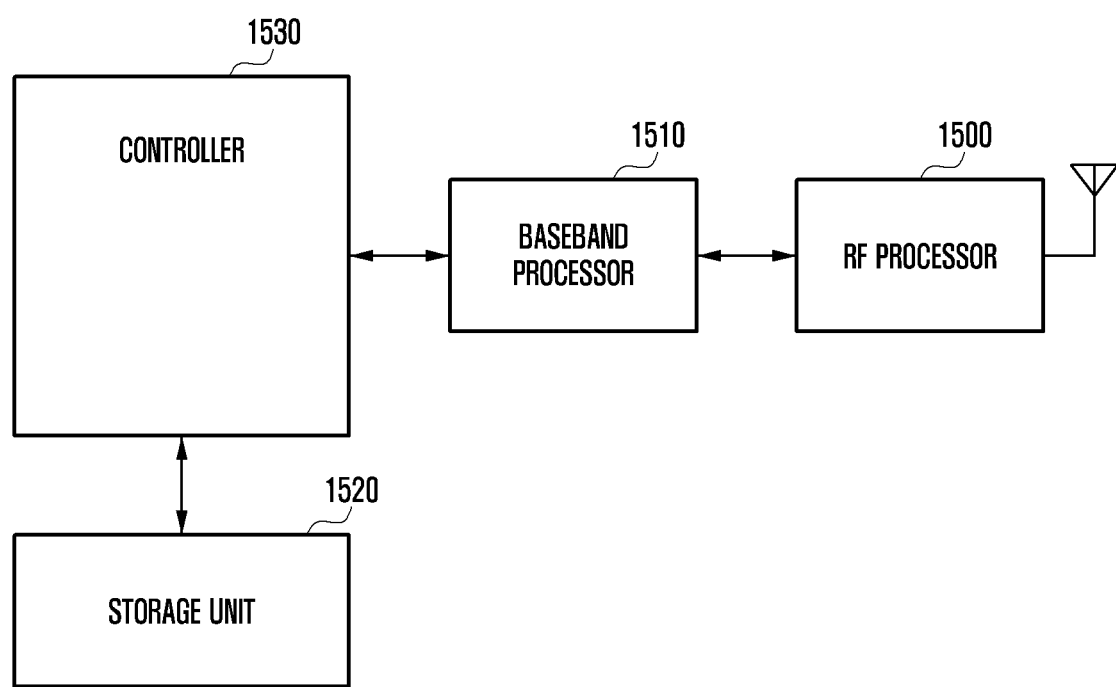
FIG. 15 is a block diagram illustrating a configuration of a UE according to an embodiment of the present invention.

FIG. 15 is a block diagram illustrating a configuration of a UE according to an embodiment of the present invention.

In reference to FIG. 15, the UE includes a radio frequency (RF) processor 1500, a baseband processor 1510, a storage unit 1520, and a controller 1530.

The RF processor 1500 has a function for transmitting/receiving a signal over a radio channel such as band conversion and amplification of the signal. That is, the RF processing unit 1500 up-converts a baseband signal from the baseband processor 1510 to an RF band signal and transmits the RF signal via an antenna and down-converts the RF signal received via the antenna to a baseband signal. For example, the RF processor 1500 may include a transmission filter, a reception filter, an amplifier, a mixer, an oscillator, a digital-to-analog converter (DAC), and an analog-to-digital converter (ADC). Although one antenna is depicted in FIG. 15, the UE may be provided with a plurality of antennas. The RF processor 1500 may also include a plurality of RF chains. The RF processor 1500 may perform beamforming. For beamforming, the RF processor 1500 may adjust the phase and size of a signal to be transmitted/received by means of the antennas or antenna elements. The RF processor 1500 may be configured to support a MIMO scheme with which the UE can receive multiple layers simultaneously.

The baseband processor 1510 has a baseband signal-bit string conversion function according to a physical layer standard of the system. For example, in a data transmission mode, the baseband processor 1510 performs encoding and modulation on the transmission bit string to generate complex symbols. In a data reception mode, the baseband processor 1510 performs demodulation and decoding on the baseband signal from the RF processor 1500 to recover the transmitted bit string. In the case of using an OFDM scheme for data transmission, the baseband processor 1510 performs encoding and modulation on the transmission bit string to generate complex symbols, maps the complex symbols to subcarriers, performs inverse fast Fourier transform (IFFT) on the symbols, and inserts a cyclic prefix (CP) into the symbols to generate OFDM symbols. In the data reception mode, the baseband processor 1510 splits the baseband signal from the RF processor 1500 into OFDM symbols, performs fast Fourier transform (FFT) on the OFDM symbols to recover the signals mapped to the subcarriers, and performs demodulation and decoding on the signals to recover the transmitted bit string.

The baseband processor 1510 and the RF processor 1500 process the transmission and reception signals as described above. Accordingly, the baseband processor 1510 and the RF processor 1500 may be referred to as a transmitter, a receiver, a transceiver, or a communication unit. At least one of the baseband processor 1510 and the RF processor 1500 may include a plurality of communication modules for supporting different radio access technologies. At least one of the baseband processor 1510 and the RF processor 1500 may also include multiple communication modules for processing the signals in different frequency bands. For example, the different radio access technologies may include a wireless local area network (WLAN) (e.g., Institute of Electrical and Electronics Engineers (IEEE) 802.11) and a cellular network (e.g., LTE). The different frequency bands may include a super high frequency (SHF) band (e.g., 2.5 GHz and 5 GHz bands) and an mmWave band (e.g., 60 GHz).

The storage unit 1520 stores data such as basic programs for operation of the UE, application programs, and setting information. The storage unit 1520 may also store the information on a second access node for radio communication with a second radio access technology. The storage unit 1520 provides the stored information in response to a request from the controller 1530.

The controller 1530 controls overall operations of the UE. For example, the controller 1530 controls the baseband processor 1510 and the RF processor 1500 for transmitting and receiving signals. The controller 1530 writes and reads data to and from the storage unit 1530. For this purpose, the controller 1530 may include at least one processor. For example, the controller 1530 may include a communication processor (CP) for controlling communications and an application processor (AP) for controlling higher layer programs such as applications.

Figure 16:
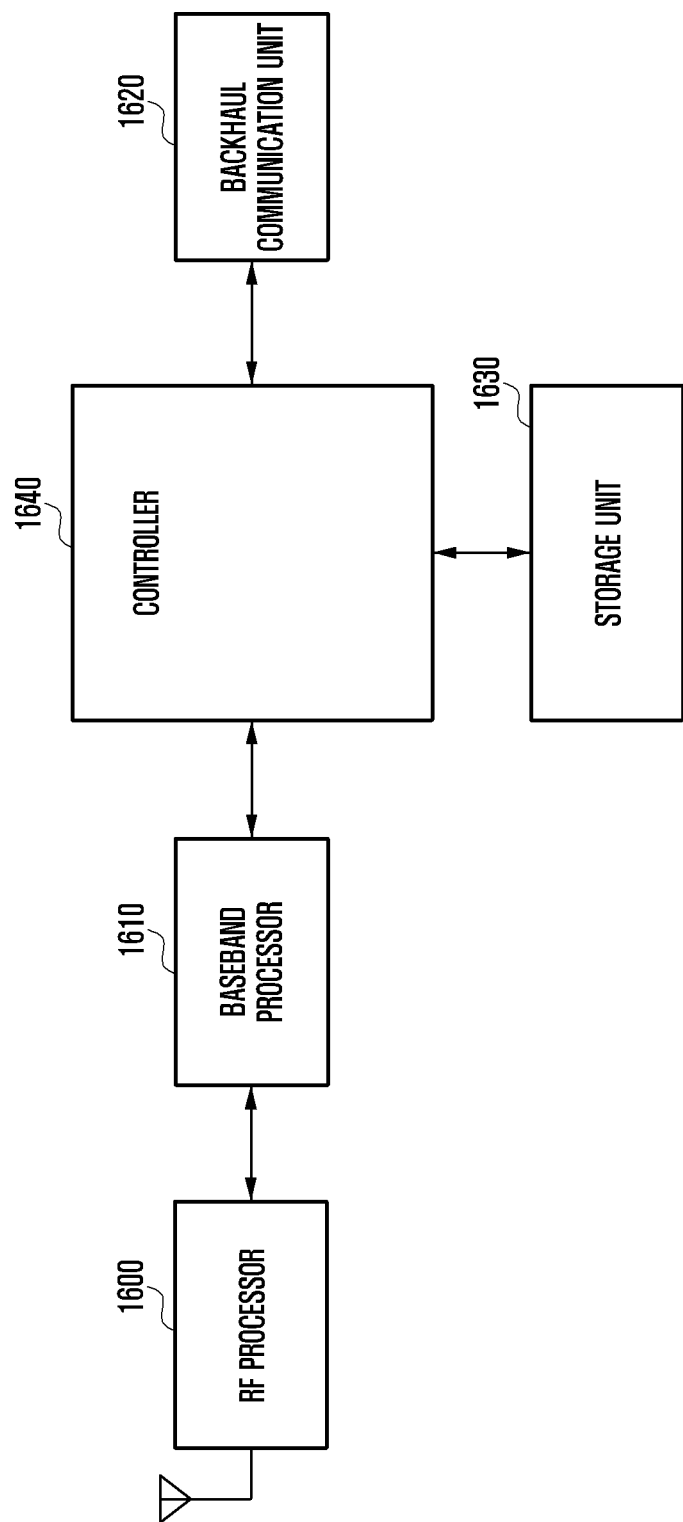
FIG. 16 is a block diagram illustrating a configuration of a base station according to an embodiment of the present invention.

FIG. 16 is a block diagram illustrating a configuration of a base station according to an embodiment of the present invention.

In reference to FIG. 16, the base station includes an RF processor 1600, a baseband processor 1610, a backhaul communication unit 1620, a storage unit 1630, and a controller 1640.

The RF processor 1600 has a function for transmitting/receiving a signal over a radio channel such as band conversion and amplification of the signal. That is, the RF processing unit 1600 up-converts a baseband signal from the baseband processor 1610 to an RF band signal and transmits the RF signal via an antenna and down-converts the RF signal received via the antenna to a baseband signal. For example, the RF processor 1600 may include a transmission filter, a reception filter, an amplifier, a mixer, an oscillator, a DAC, and an ADC. Although one antenna is depicted in FIG. 16, the base station may be provided with a plurality of antennas. The RF processor 1600 may also include a plurality of RF chains. The RF processor 1600 may perform beamforming. For beamforming, the RF processor 1600 may adjust the phase and size of a signal to be transmitted/received by means of the antennas or antenna elements. The RF processor 1600 may be configured to transmit one or more layers for a downlink MIMO operation.

The baseband processor 1610 has a baseband signal-bit string conversion function according to a physical layer standard of the system. For example, in a data transmission mode, the baseband processor 1610 performs encoding and modulation on the transmission bit string to generate complex symbols. In a data reception mode, the baseband processor 1610 performs demodulation and decoding on the baseband signal from the RF processor 1600 to recover the transmitted bit string. In the case of using an OFDM scheme for data transmission, the baseband processor 1610 performs encoding and modulation on the transmission bit string to generate complex symbols, maps the complex symbols to subcarriers, performs inverse fast Fourier transform (IFFT) on the symbols, and inserts a cyclic prefix (CP) into the symbols to generate OFDM symbols. In the data reception mode, the baseband processor 1610 splits the baseband signal from the RF processor 1600 into OFDM symbols, performs fast Fourier transform (FFT) on the OFDM symbols to recover the signals mapped to the subcarriers, and performs demodulation and decoding on the signals to recover the transmitted bit string. The baseband processor 1610 and the RF processor 1600 process the transmission and reception signals as described above. Accordingly, the baseband processor 1610 and the RF processor 1600 may be referred to as a transmitter, a receiver, a transceiver, or a communication unit.

The backhaul communication unit 1620 provides an interface for communication with other nodes in the network. That is, the backhaul communication unit 1620 converts a bit string to be transmitted from the base station to another node, e.g., another base station and core network, to a physical signal and converts a physical signal received from another node to a bit string.

The storage unit 1630 stores data such as basic programs for operation of the base station, application programs, and setting information. The storage unit 1630 may also store the information on the bearers established for UEs and measurement results reported by the connected UEs. The storage unit 1630 may also store the information for use by a UE in determining whether to enable or disable multi-connectivity. The storage unit 1630 may provide the stored data in reference to a request from the controller 1640.

The controller 1640 controls overall operations of the base station. For example, the controller 1640 controls the baseband processor 1610, the RF processor 1600, and the backhaul communication unit 1620 for transmitting and receiving signals. The controller 1640 writes and reads data to and from the storage unit 1630. For this purpose, the controller 1640 may include at least one processor.

A transmitter for transmitting a signal in a wireless communication system includes a transmit unit configured to transmit the signal to a receiver and a controller configured to control to check segment offset (SO) information and generate a first layer protocol data unit (PDU) including the SO information and control the transmit unit to transmit the first layer PDU, wherein the first layer PDU includes at least one header and a second layer PDU group corresponding to the header and the second layer PDU group includes at least one second layer PDU. A receiver for receiving a signal in a wireless communication system includes a receive unit configured to receive a signal from a transmitter and a controller configured to control the receive unit to receive a first layer protocol data unit (PDU) including segment offset (SO) information, check the SO information, and recover a second layer PDU from the first layer PDU based on the SO information, wherein the first layer PDU includes at least one header and a second layer PDU group corresponding to the header and the second layer PDU group includes at least one second layer PDU. In the embodiments of the present inventions, the components are described in singular or plural forms depending on the embodiment. However, the singular and plural forms are selected appropriately for the proposed situation for explanatory convenience only without any intention of limiting the present invention thereto; thus, the singular form includes the plural forms as well, unless the context clearly indicates otherwise.

Although the description has been made with reference to particular embodiments, the present invention can be implemented with various modifications without departing from the scope of the present invention. Thus, the present invention is not limited to the particular embodiments disclosed, and it will include the following claims and their equivalents.

The invention claimed is:

1. A method performed by a transmitter in a communication system, the method comprising:

obtaining, by a medium access control (MAC) entity of the transmitter, a MAC service data unit (SDU);

generating, by the MAC entity, a MAC protocol data unit (PDU) including a MAC subheader and the MAC SDU; and sending, by the MAC entity, the MAC PDU to a lower layer, wherein the MAC subheader corresponds to the MAC SDU, wherein the MAC subheader to which the MAC SDU corresponds is placed immediately in front of the MAC SDU, and wherein the MAC subheader to which the MAC SDU corresponds does not include an E field indicating whether another MAC subheader, MAC control element (CE), or MAC SDU follows.

2. The method of claim 1, wherein the MAC subheader to which the MAC SDU corresponds includes a logical channel identifier (LCID) field.

3. The method of claim 2, wherein the MAC subheader to which the MAC SDU corresponds further includes a length field.

4. A method performed by a receiver in a communication system, the method comprising:

receiving, by a medium access control (MAC) entity of the receiver, a MAC protocol data unit (PDU) from a lower layer;

identifying, by the MAC entity, a MAC service data unit (SDU) and a MAC subheader based on the MAC PDU; and delivering, by the MAC entity, the MAC SDU, wherein the MAC subheader corresponds to the MAC SDU, wherein the MAC subheader to which the MAC SDU corresponds is placed immediately in front of the MAC SDU, and wherein the MAC subheader to which the MAC SDU corresponds does not include an E field indicating whether another MAC subheader, MAC control element (CE), or MAC SDU follows.

5. The method of claim 4, wherein the MAC subheader to which the MAC SDU corresponds includes a logical channel identifier (LCID) field.

6. The method of claim 5, wherein the MAC subheader to which the MAC SDU corresponds further includes a length field.

7. A transmitter in a communication system, the transmitter comprising:

a transceiver; and a controller coupled with the transceiver and configured to:

obtain, by a medium access control (MAC) entity of the transmitter, a MAC service data unit (SDU), generate, by the MAC entity, a MAC protocol data unit (PDU) including a MAC subheader and the MAC SDU, and send, by the MAC entity, the MAC PDU to a lower layer, wherein the MAC subheader corresponds to the MAC SDU, wherein the MAC subheader to which the MAC SDU corresponds is placed immediately in front of the MAC SDU, and wherein the MAC subheader to which the MAC SDU corresponds does not include an E field indicating whether another MAC subheader, MAC control element (CE), or MAC SDU follows.

8. The transmitter of claim 7, wherein the MAC subheader to which the MAC SDU corresponds includes a logical channel identifier (LCID) field.

9. The transmitter of claim 8, wherein the MAC subheader to which the MAC SDU corresponds further includes a length field.

10. A receiver in a communication system, the receiver comprising:

a transceiver; and a controller coupled with the transceiver and configured to:

receive, by a medium access control (MAC) entity of the receiver, a MAC protocol data unit (PDU) from a lower layer, identify, by the MAC entity, a MAC service data unit (SDU) and a MAC subheader based on the MAC PDU, and deliver, by the MAC entity, the MAC SDU, wherein the MAC subheader corresponds to the MAC SDU, wherein the MAC subheader to which the MAC SDU corresponds is placed immediately in front of the MAC SDU, and wherein the MAC subheader to which the MAC SDU corresponds does not include an E field indicating whether another MAC subheader, MAC control element (CE), or MAC SDU follows.

11. The receiver of claim 10, wherein the MAC subheader to which the MAC SDU corresponds includes a logical channel identifier (LCID) field.

12. The receiver of claim 11, wherein the MAC subheader to which the MAC SDU corresponds further includes a length field.

* * * * *